US 12,190,276 B2
United States Patent
Chuang et al.

(10) Patent No.: US 12,190,276 B2
(45) Date of Patent: Jan. 7, 2025

(54) MOBILE RECONFIGURABLE MODULAR ELECTRONIC FREIGHT TERMINAL AND FREIGHT CONTAINER MODULE THEREOF

(71) Applicant: Mintron Energy Technology Co., Ltd., Taoyuan (TW)

(72) Inventors: Chia-Ming Chuang, Taoyuan (TW); Chen-Sheng Huang, Taoyuan (TW)

(73) Assignee: MINTRON ENERGY TECHNOLOGY CO., LTD., Taoyuan (TW)

( * ) Notice: Subject to any disclaimer, the term of this patent is extended or adjusted under 35 U.S.C. 154(b) by 887 days.

(21) Appl. No.: 17/247,812

(22) Filed: Dec. 23, 2020

(65) Prior Publication Data
US 2021/0216956 A1 Jul. 15, 2021

(30) Foreign Application Priority Data

Jan. 14, 2020 (CN) .................. 202010036214.X

(51) Int. Cl.
*B66F 9/06* (2006.01)
*B60P 1/00* (2006.01)
(Continued)

(52) U.S. Cl.
CPC ............ *G06Q 10/0832* (2013.01); *B60P 1/00* (2013.01); *B65D 88/12* (2013.01); *B65G 1/04* (2013.01);
(Continued)

(58) Field of Classification Search
None
See application file for complete search history.

(56) References Cited

U.S. PATENT DOCUMENTS

| 4,289,442 A * | 9/1981 | Stevens ...................... B66F 9/10 |
| | | 414/629 |
| 5,391,038 A * | 2/1995 | Stewart .................. B65G 67/02 |
| | | 414/398 |

(Continued)

FOREIGN PATENT DOCUMENTS

WO 2019017292 A1 1/2019

OTHER PUBLICATIONS

Notice of Patent Grant of SG application 10202013171U, published on Jul. 11, 2023.
(Continued)

*Primary Examiner* — Mark C Hageman
(74) *Attorney, Agent, or Firm* — Ying-Ting Chen; Law Office of Michael Chen

(57) ABSTRACT

An unmanned handling unit for a reconfigurable decentralized shipping system operates whereby a shipper first selects a freight container module of one of a plurality of sizes to pack at least one item, and then ships it to a predetermined target; the shipper inputs shipping information to the shipping system; when the shipper and/or the predetermined target modifies the shipping information, delivery is modified in real time. The reconfigurable decentralized shipping system includes a plurality of transport means operating in respective operating areas and configured with at least one unmanned handling unit, each of the operating areas including a plurality of freight terminal staging points and at least intersected with at least another one of the operating areas.

5 Claims, 21 Drawing Sheets

(51) Int. Cl.
  _B65D 88/12_ (2006.01)
  _B65G 1/04_ (2006.01)
  _B66F 9/075_ (2006.01)
  _G06Q 10/0832_ (2023.01)

(52) U.S. Cl.
  CPC ............... _B66F 9/06_ (2013.01); _B66F 9/075_ (2013.01); _B65D 2203/00_ (2013.01); _B65D 2255/00_ (2013.01)

(56) References Cited

U.S. PATENT DOCUMENTS

| | | | |
|---|---|---|---|
| 10,227,176 B2 * | 3/2019 | Sugahara | B65G 1/1375 |
| 10,343,881 B2 * | 7/2019 | Guo | B65G 1/10 |
| 10,689,212 B2 * | 6/2020 | Bangalore Srinivas | |
| | | | B65G 67/08 |
| 11,111,121 B2 * | 9/2021 | Nakamoto | B66F 17/003 |
| 11,338,997 B2 * | 5/2022 | Ueda | B65G 1/0492 |
| 11,370,643 B2 * | 6/2022 | Hasegawa | B66F 9/10 |
| 11,420,338 B2 * | 8/2022 | Bondaryk | B25J 11/008 |
| 11,530,120 B2 * | 12/2022 | Ueda | B66F 9/063 |
| 2005/0042068 A1 * | 2/2005 | Ehmen | B66F 9/10 |
| | | | 414/661 |
| 2019/0302787 A1 | 10/2019 | Li | |
| 2021/0179352 A1 * | 6/2021 | Haid | B65G 1/0492 |

OTHER PUBLICATIONS

Notice of Patent Grant of SG application 10202203680T, published on Aug. 8, 2023.
Examination Report of IN application 202114001710, published on Feb. 28, 2022.

\* cited by examiner

MOBILE RECONFIGURABLE MODULAR ELECTRONIC FREIGHT TERMINAL AND FREIGHT CONTAINER MODULE THEREOF

FIELD

Embodiments of the present disclosure relate to an unmanned handling unit, and more particularly relate to an unmanned handling unit for a reconfigurable decentralized shipping system.

BACKGROUND

For logistics shipping, a core issue lies in how to enhance freight shipping efficiency to thereby reduce expenses or promote profits. To achieve that, a large logistics service provider generally chooses an inexpensive location in a large geographical territory to establish a cargo hub. This large geographical territory is then further partitioned into a plurality of cells; each cell is equipped with dedicated trucks and other forms of small transport means, which are responsible for, within their respective cells, delivering shipments to recipients and collecting shipper's carriages for shipping to designated destinations. The trucks and even the small transport means carry those interregional shipments to the cargo hub at regular time, where such shipments are pooled, sorted, and then dispatched to corresponding trucks or small transport means to carry back to their respective responsible cells and deliver to the recipients.

Those countries with flourishing industry and commerce have a huge daily throughput of interregional or international freights, such that an international airport has to separately arrange a cargo terminal in the airport territory for freighters to take off or land to load and offload cargos at nights, or even invests on a cargo airport. Some large international logistics service providers even establish dedicated airports in one or more countries and own dedicated freighter fleets, for inter-regionally or internationally shipping the goods consigned by clients. Time scheduling matters much to this centralized logistics mode. A client must contact the logistics service provider first to agree on the time for sending or receiving a shipment. The main shipping links, including shipment gathering and re-dispatching, are all performed at fixed time frames to enhance transit efficiency.

However, this centralized logistics process inevitably requires establishment of a cargo hub in a remote area, as well as provision of efficient sorting facilities. Planning of such a hub not only requires a heavy investment on construction, but also wastes time for the transport vehicles compulsorily shuttling between their respective cells and the hub. Particularly, it requires all vehicles and even flights bearing freights to arrive in a specific tight time frame for distribution, and such freights are sorted very fast, then fast transshipped and allocated to various destinations, and dispatched to all trucks and flights to carry away the shipments destined to their respective areas. Under the stress of so short a time window, misidentification, collision or inadvertent falloff during handling frequently occur, and mistaken sorting of or damages to shipments are not uncommon during shipping.

This shipping mode with a single parcel as a shipping unit requires repeated identification work during transit, which also causes progressive increase of errors in automatic identification. Besides, as the parcels possibly do not have standard sizes or are not placed on definite locations, an identification error or failure further requires manual troubleshooting, which further increases troubleshooting costs. In addition, despite the efficient shipping of logistics service providers, it frequently occurs in the last link that the recipient is not available or the recipient address is mistranslated, which wastes the precious time of courier to re-deliver, or postpones delivery. From the shipper's perspective, his or her business opportunity might be missed if the shipment is delayed due to some reason.

A typical logistics system involves transport vehicles such as different sizes of trucks and aircrafts during parcel transiting. Each time of parcel offloading and relocating likely causes, inter alia, mutual crushing, falloff, or missing. Manual handling of the shipments is inevitable, which not only consumes manpower costs but also affects delivery time due to work hour limits of workers, but also incurs liabilities such as artificial damages to the shipments, delivery to a wrong address, and vehicle accidents on road, etc. Further, the conventional logistics system takes the designated address as the shipping destination, and there is no way to access the accurate position of a shipment in a certain truck during transit; in cases where the destination is changed, the shipment has to be found out from a pile of shipments and then identified; therefore, for conventional express logistics, after a parcel has been picked up, the designated destination cannot be changed. Whether to redeliver another day or send the parcel back to the shipper can only be decided on upon delivery failure.

Besides, in conventional logistics systems, although limitations are imposed on parcel sizes, shippers would still pack them as full as possible so as to save freight charges, which likely cause a standard carton to bulge in the center. The bulge not only likely causes the shipments to be hard to stack, but also causes the stacked shipments unstable, posing risks of toppling and falling during transit. In cases of freight collisions, the logistic service provider directly shifts the liability to the shipper. In such cases, parcel packages cannot guarantee vibration resistance and impact resistance.

Therefore, the Chinese invention—patent application No. CN201910943811.8 filed by the same invention discloses that the following problems need to be resolved in the field: how to improve the logistics process such that the recipient and the shipper can receive or send a shipment at any convenient time, thereby improving pickup/delivery friendliness; how to eliminate the need of establishing a large cargo hub to reduce costs, and avoid forcibly fast sorting in a particular short time window so as to lower the odds of violently handling the parcels and then reduce misidentification and damages; how to enable the pickup and delivery personnel to effectively pick up and deliver the shipments so as to mitigate unnecessary manpower waste in redelivery; and how to enable change of the destination address or target in real time so as to offer shipping flexibility.

Correspondingly, the present disclosure is to further disclose how to improve secure storage of a shipment during transit so as to ensure safety of the articles therein; and meanwhile, with an appropriate unmanned handling unit, loading and offloading of freights are faster and more stable; besides, with smart operations of the unmanned handling unit, the freights can be sufficiently scheduled and pre-sorted, eliminating the urgent operations in a hub; as such, the present disclosure not only enables precise positioning of all freights, reduction of repeated identifications, and avoidance of misidentification, but also enables reception of instructions at any time to change recipient addresses or targets, all of which are problems to be solved in the art.

SUMMARY

To address the deficiencies above, embodiments of the present disclosure provide an unmanned handling unit for a reconfigurable decentralized shipping system, so as to: (1) handle freight container modules in batches, distribute the freight container modules within the transport means, and securely pick up and place the freight container modules and/or the freight terminals, such that the reconfigurable decentralized shipping system can operate smoothly and flexibly; (2) enable the unmanned handling unit to stack all shipments neatly and compactly, thereby enhancing the efficiency in collecting and shipping the shipments; (3) enable significant replacement and reduction of cargo hubs; (4) enable significant reduction of odds of shipment damages during transit. Besides, the present disclosure further provides a freight container module used for an unmanned handling unit for a reconfigurable decentralized shipping system.

According to embodiments, there is provided an unmanned handling unit for a reconfigurable decentralized shipping system, wherein the reconfigurable decentralized shipping system is configured for a shipper to send at least one shipment to a predetermined target, the shipment being pre-packed into a freight container module and deposited in a freight terminal, the freight container module being of a size selected from a plurality of predetermined sizes, and the shipper pre-inputting shipping information including shipment information and predetermined target information to the reconfigurable decentralized shipping system; wherein when the shipper and/or the predetermined target modifies the shipping information, delivery is modified in real time; the reconfigurable decentralized shipping system comprises a plurality of transport means operating in respective operating areas, each of the operating areas being at least intersected with at least another one of the operating areas, each of the operating areas including a plurality of freight terminal staging points, at least one unmanned handling unit being provided for each of the transporting means; wherein the unmanned handling unit comprises: a chassis including at least one load carrier for securely bearing the freight terminal, at least two wheels that are rotatable relative to each other and provided at the load carrier, and a plurality of action actuation means respectively for driving the wheels; a retractable assisted platform that is retractable relative to the chassis, the retractable assisted platform including a corpus, retractable driving means configured to drive the corpus to move between a receiving position that overlaps with the load carrier in a height direction and an operating position mainly exposed outside the load carrier in the height direction, and a group of movers disposed on the corpus for transferring the freight terminal; and a group of freight container module pickup and delivery means disposed on the corpus.

According to embodiments, a freight container module used for an unmanned handling unit for a reconfigurable decentralized shipping system is provided, the freight container module having identity identifying means, wherein the freight container module is available for at least one shipper to pre-pack at least one shipment, and after the identity identifying means identifies the freight container module, the freight container module is shipped by the reconfigurable decentralized shipping system to one predetermined target (recipient/truck/freight collection location); wherein the freight container module is of a size selected from a plurality of predetermined sizes; wherein the reconfigurable decentralized shipping system comprises a plurality of pared lock bars and at least one receiving means; wherein the freight container module comprises:

a body configured to receive the shipment; and a pair of pivotal lock bars, disposed pairwise on the body corresponding to the paired lock bars, the pair of pivotal lock bars being configured for mutually locking with the lock bars to receive the freight container module into the receiving means and for mutually detaching from the lock bars to take out the freight container module with the shipment packed from the receiving means, each of the pivotal lock bars having at least one elastomer, the elastomer being configured for providing elasticity after the pivotal lock bars are mutually locked with the lock bars to thereby securely store the freight container module in one of the receiving means.

The unmanned handling unit according to the present disclosure has a chassis and a retractable assisted platform that is retractable relative to the chassis, such that the unmanned handling unit is selectively received or extended, without excessively occupying the cabin space of the transporting means. Besides, as the unmanned handling unit has a group of movers and freight container module pickup and delivery means, irrespective of handling of the entire freight terminal or transferring of an individual freight container module, they can both be executed smoothly, such that a single unmanned handling unit had dual functions, i.e., not only capable of handling the freight terminal between the transport means and an external staging point or another transport means, but also capable of sorting and transferring freight container modules during operating of the transport means, thereby effectively implementing the core step of decentralized shipping and significantly replacing the logistics operation mode of conventional cargo hubs.

Particularly, after the sorting mechanism is decentralized, the dispatching and transferring procedures of all freight container modules are mainly decentralized in various transport means, which renders the sorting process not urgent, i.e., without time stress; in addition, the freight container module pickup and delivery means can transfer securely, further reducing risks of crushing and falling off to damage the shipments during transit. Furthermore, the unmanned handling unit can directly deliver a freight container module or shipment in the freight container module to the recipient, significantly enhancing the operation elasticity of the entire reconfigurable decentralized shipping system.

By virtue of the present disclosure, each freight container module is securely stored and accurately positioned, which not only overcomes the issues in parcel identification and transit safety and enhances delivery flexibility, but also allows for changing of the reception address, time, or even the recipient, thereby significantly reducing repeated and inefficient attendance incurred by delivery failure and thus reducing costs. The present disclosure amounts to a revolutionary improvement.

Among the drawings: 1, 1' reconfigurable decentralized shipping system; 211, 211' immobilized column; 2111 strong electromagnet; 212 fixation hole; 213 supporting member; 214, 214' pivotal lock bar; 2141, 2141' hooking member; 2142, 2142' grip; 215, 215' spring; 22 base; 221 long-foot slot; 23 vertical mounting frame; 24 hanger; 30 unmanned handling unit; 301 long foot; 302 short foot; 303' multi-articulated cylinder; 304 auto guided means; 305' freight terminal receiving unit; 306' access port; 307' bridging board; 3, 3' transport means; 300, 300' freight terminal; 31 chassis; 311 load carrier; 312, 34' wheel; 32 action actuating means; 320' closed railway; 321 energy storage means; 322 charging port; 33 retractable aided platform; 330' pallet; 332 telescopic drive; 333 corpus; 3331 short-foot slot; 3332 lift unit; 3333 lift table; 334 pickup and delivery means; 3341 upright lift arm; 3342 retractable pivotal arm; 335 payload confirmation means; 36, 36' sensing means; 37 microprocessing means; 39 snap-hook; 4 server; 5, 5' wireless communication means; 60 empty freight container module; 601 identification mark; 62, 62' loaded freight container module; A, A', B, B', C, C', D, D' operating regions.

DETAILED DESCRIPTION OF EMBODIMENTS

Hereinafter, the present disclosure will be illustrated in further detail through preferred embodiments with reference to the accompanying drawings. Such embodiments shall be construed as only intended for illustrating the present disclosure, rather than limiting the protection scope thereof. After having read the description of the present disclosure, those skilled in the art may make various alterations or modifications to the present disclosure, and such equivalent alterations and modifications also fall within the scope limited in the appended claims.

First Preferred Embodiment

Figure 1:
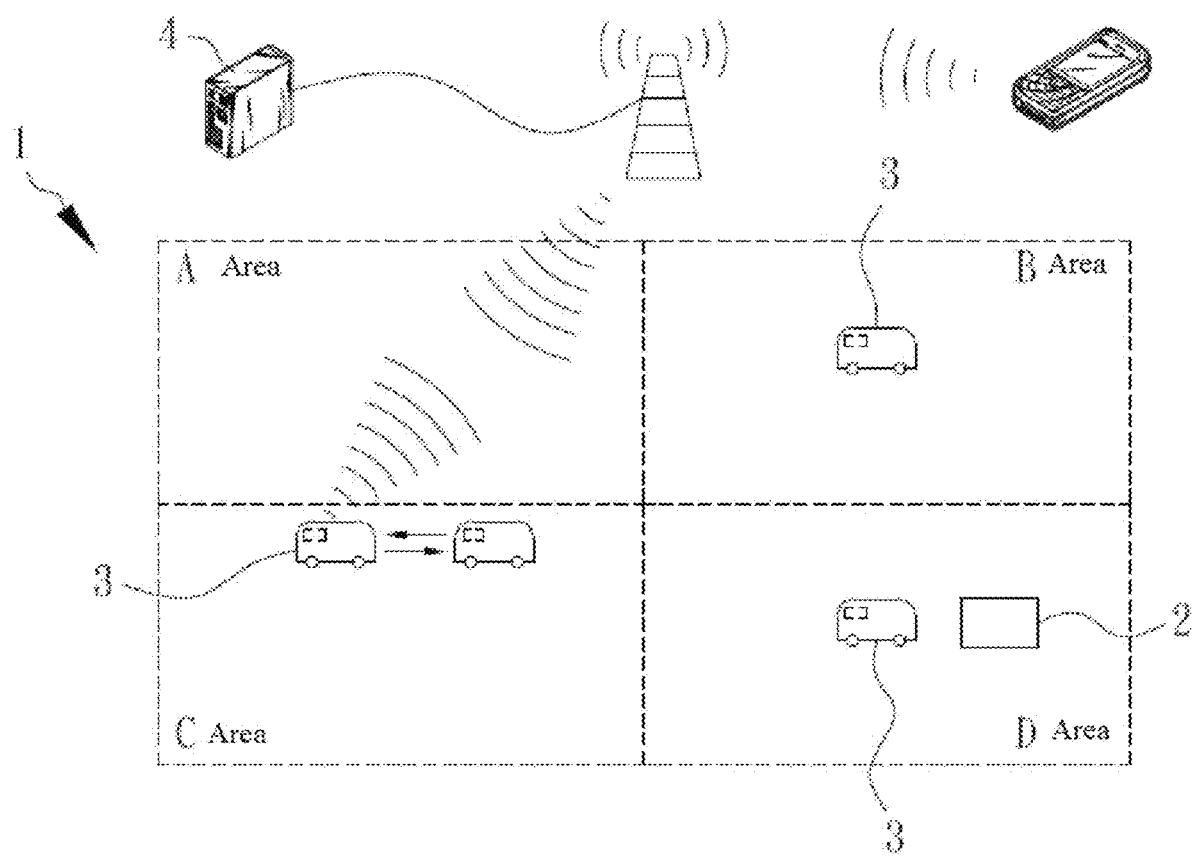
FIG. 1 is a schematic diagram of operating regions of a reconfigurable decentralized shipping system according to the first preferred embodiment of the present disclosure.

FIG. 1 shows a reconfigurable decentralized shipping system 1 provided according to the first preferred embodiment of the present disclosure, which is configured for a shipper to send at least one shipment to a predetermined target. In this embodiment, a system operator partitions, for example, a service territory of one county/city into operating areas A, B, C, and D based on actual operation needs, each operating area being arranged with at least one transport means 3, each of the transport means 3 operating in their respective operating areas, and each of the operating areas having an intersected zone at least with another neighboring operating area; as such, one transport means 3 may transship the shipment carried thereby to the transport means 3 for the neighboring operating area. In this way, the logistics service provider delivers, stage by stage, the shipment to the recipient or reception location, without a need of assembling all shipments to a certain hub, thereby realizing the decentralized freight shipping in the sense of the present disclosure.

In this embodiment, the shipper is a member already registered in the system. Before shipping, the shipper is required to prepare an appropriate empty freight container module with a unique identifier for packing the shipment. In this embodiment, an example of the freight container module is a plastic steel-board box affixed with an identification bar code at a designated position. However, the present disclosure is not limited thereto. The freight container modules may also be made of plank, laminated board, or similar materials. The freight container module is provided in a plurality of different standard sizes. In this embodiment, the freight container module only has one single preset depth, and its size is selected from a plurality of preset sizes that are simple integer multiples of preset length and width.

Figure 2:
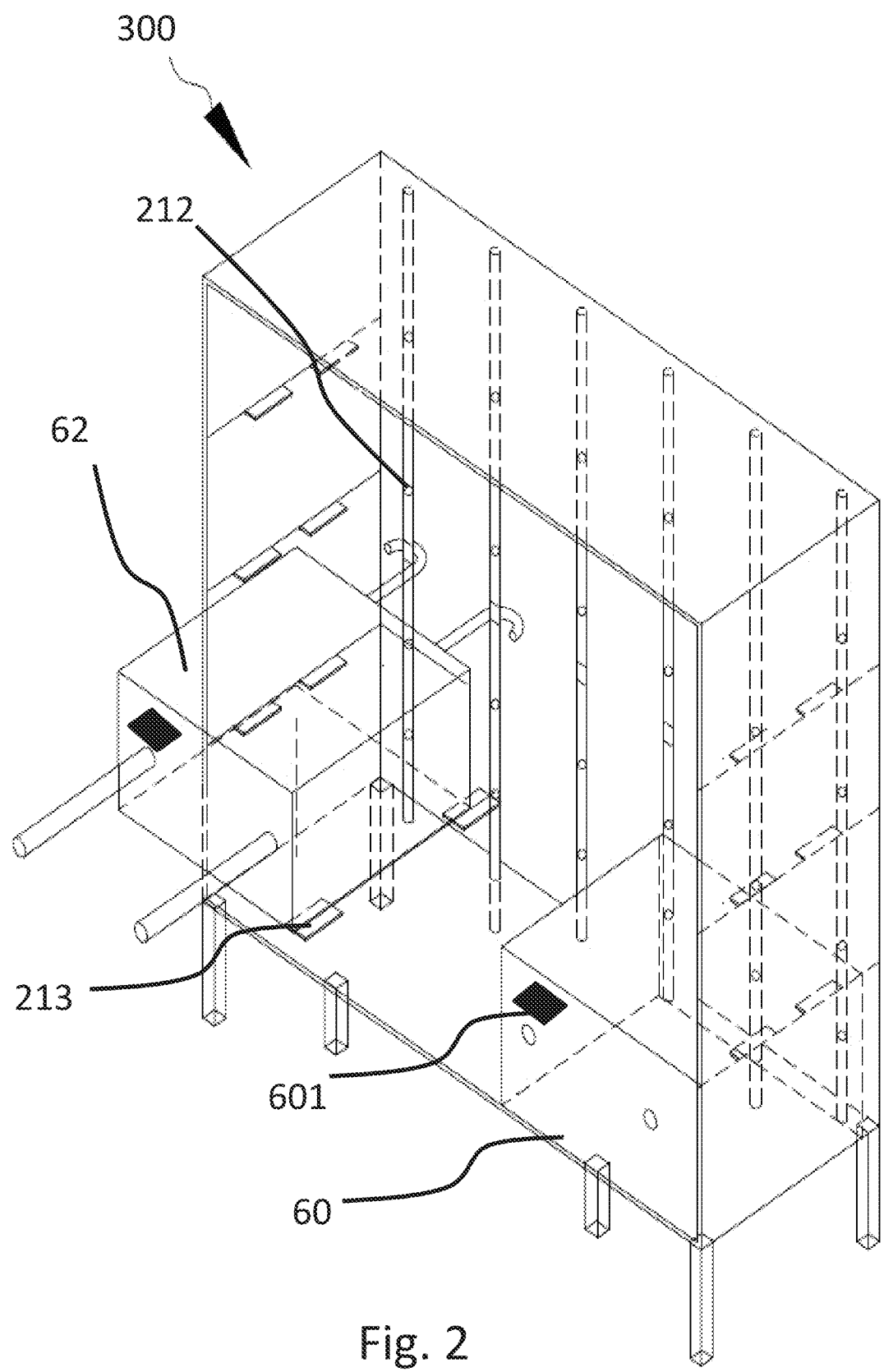
FIG. 2 is a stereoscopic schematic diagram of a freight terminal according to the first preferred embodiment of the present disclosure.
Figure 3:
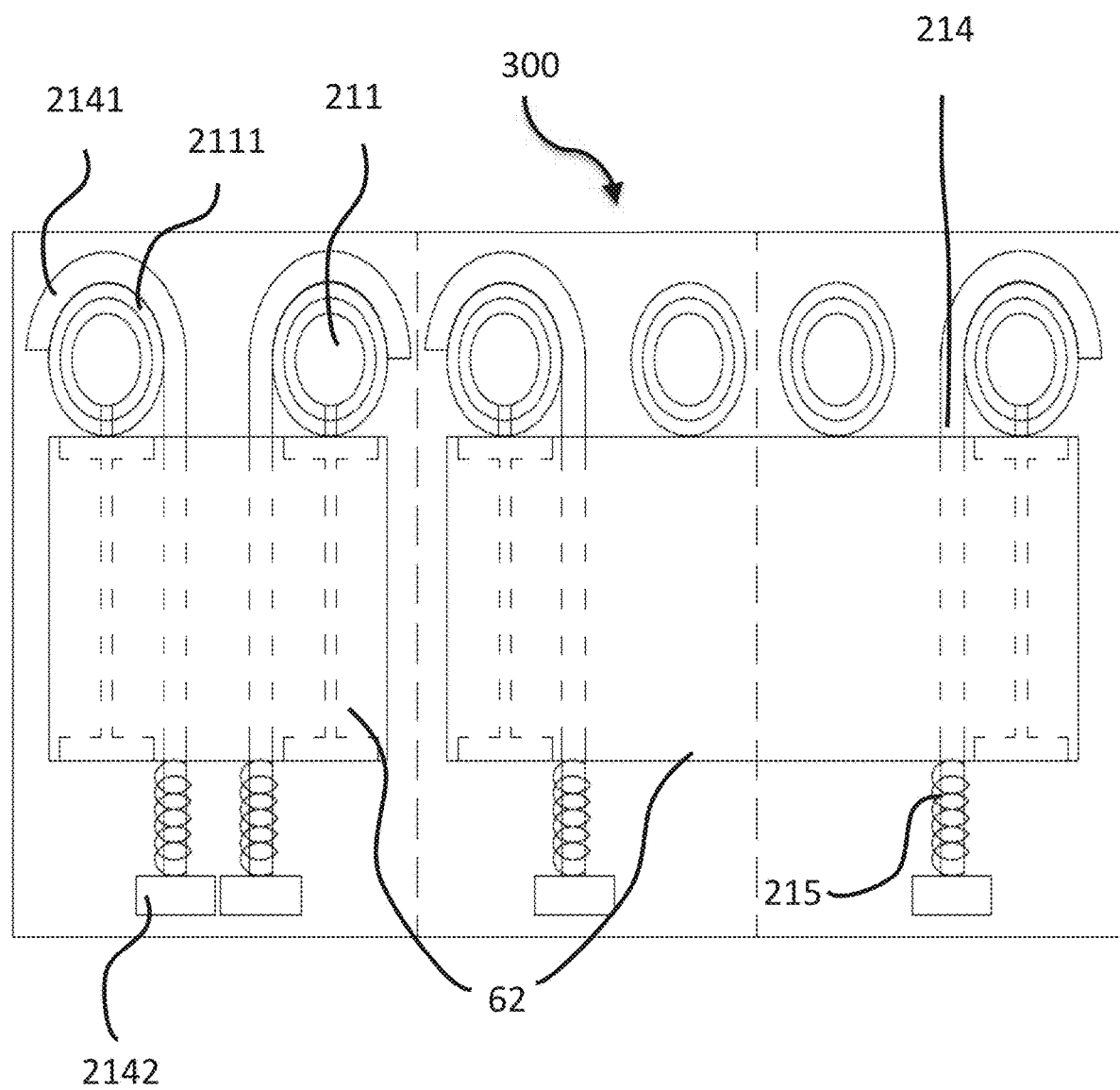
FIG. 3 is a schematic perspective top view of the freight terminal of FIG. 2 (illustrating the size and fixation manner of a freight container module).

Please refer to FIG. 2 and FIG. 3. In this embodiment, the shipper places the shipment into a freight container module 60 in advance. For the ease of illustrating, the freight container module with the shipment packed is referred to as a loaded freight container module 62; the shipper drops off the loaded freight container module 62 to a freight terminal 300 at an agreed staging point, e.g., in one of a plurality of lockers at an unattended freight terminal staging point outside a metro station. In this embodiment, six immobilized columns 211, for example, are provided in the rear side of the freight terminal 300. As each pair of immobilized columns 211 are spaced and fixed relative to each other, while the spacing between each pair of immobilized columns 211 and its neighboring pair of immobilized columns has been standardized, if the shipper uses a freight container module of one unit width, the freight container module may be securely stored between one pair of immobilized columns 211; if the freight container module is of a two-unit width, the freight container module spans two pairs of immobilized columns 211 and then is securely stored between the outermost two columns of the four immobilized columns 211; likewise, if the freight container module has a three-unit width, it is securely stored between the outermost two columns of the six parallel immobilized columns 211. A same selection flexibility is also provided in the height direction; as such, not only the freight container module is standardized, but also an appropriate size is provided for various dimensions of shipments.

A fixation hole 212 is provided in each immobilized column 211 at the lowest position within each unit height range, available for the shipper to first insert the supporting member 213 in the vertical direction between a pair of immobilized columns 211 for securely fixing the loaded freight container module 62, such that the loaded freight container module 62 is easily placed into the freight terminal 300 via two vertical immobilized columns 211 under support by the supporting member 213; an identification symbol 601 is provided at the upper left corner of each freight container module; two hooked pivotal lock bars 214, which may be actuated to partially protrude from the spring 215 inherent to the freight container module, are respectively provided at two ends in the width direction, wherein one end of the pivotal lock bar 214 is a magnetically-conductive hooking member 2141, while the other end thereof is a non-magnetically-conductive grip 2142.

Under the elastic action of the spring 215, the shipper rotates the pivotal lock bar 214 to avoid interference with the immobilized column 211 and meanwhile pushes the hooking member 2141 towards a direction deep into the freight terminal 300. After the hooking member 2141 extends beyond the immobilized column 211, the shipper rotates the hooking member and then releases to pull back the hooking member under the relaxed elasticity of the spring 215, thereby securely catching the immobilized column 211; in this way, the action of placing the loaded freight container module 62 into the freight terminal 300 is completed. A segment where the immobilized column 211 and the hooking member 2141 contacts is mounted with a strong electromagnet 2111 to lock the hooking member 2141 by virtue of the electromagnetic force; nobody can freely take out the loaded freight container module 62 unless a set of unlock combinations is inputted over the network and the server instructs to lift the electromagnetic force to unlock the loaded freight container module 62 when the predetermined target collects the shipment or the unmanned handling unit picks up the shipment, which guarantees shipment safety and collection convenience.

Figure 4:
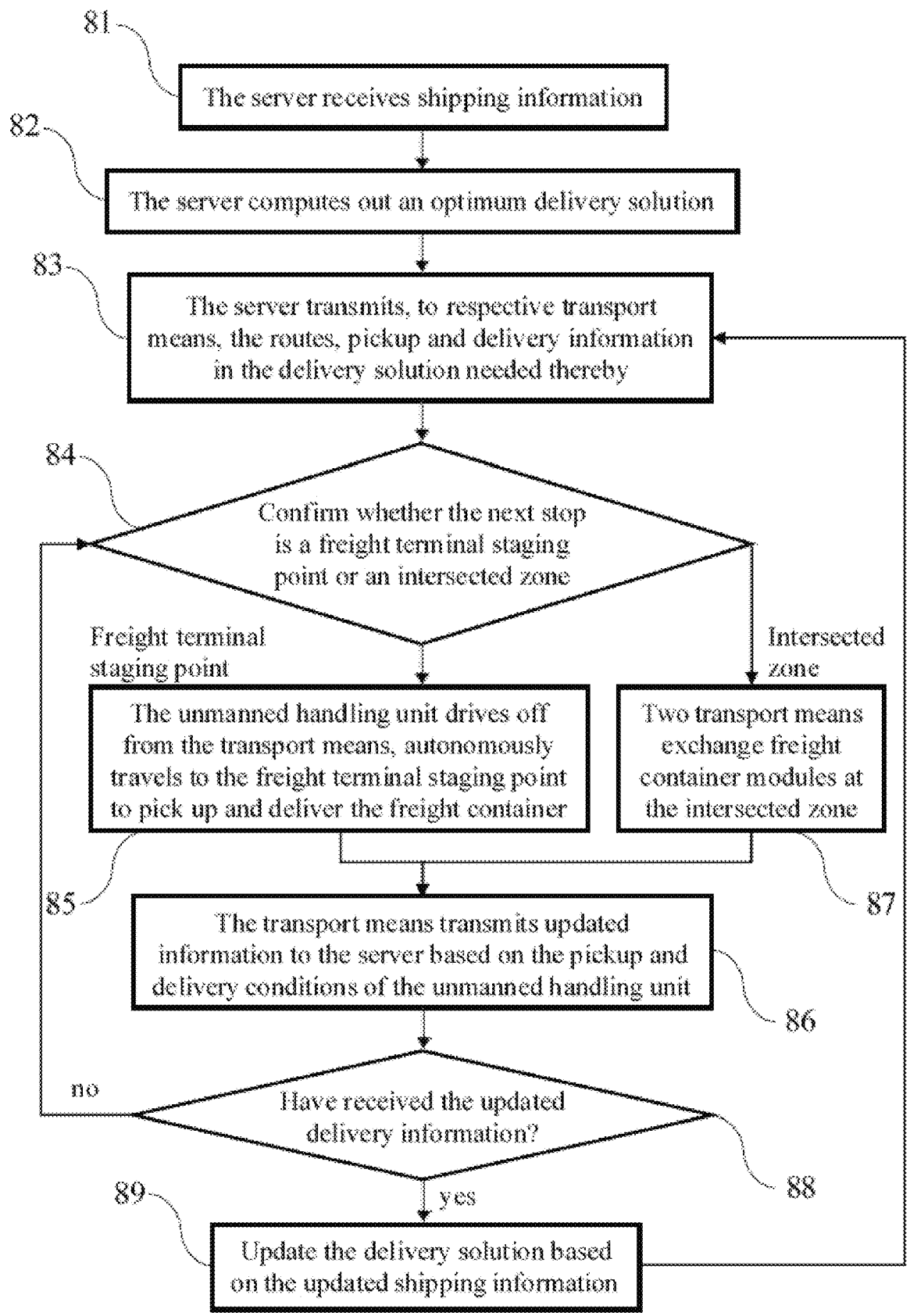
FIG. 4 is a flow chart of a shipping method according to the first preferred embodiment.

Then, the shipper connects for example his/her own smart phone or computer to the reconfigurable decentralized shipping system 1 over the network, to input the unique identifier of the loaded freight container module 62, the unique identifier of the freight terminal 300 where the freight container module 62 is stored, the position of the freight terminal 300, and the predetermined target to be shipped as one package of shipping information to the server 4 in the reconfigurable decentralized shipping system 1. In this embodiment, the server 4 is a workstation-level computer equipped with a group of network interfaces for receiving and transmitting all relevant information. After the loaded freight container module 62 is properly placed, the shipper photographs or records its deposit position, wherein the picture of the deposit position of the loaded freight container module 62 is also uploaded to the server 4 as part of the shipping information. As shown in FIG. 4, after the server 4 receives all shipping information in step 81, it quickly computes an optimal delivery solution in step 82, and then in step 83, transmits the delivery solution, the route for each transport means 3, and the pickup and delivery information to the respective transport means 3 via the network interface.

Figure 5:
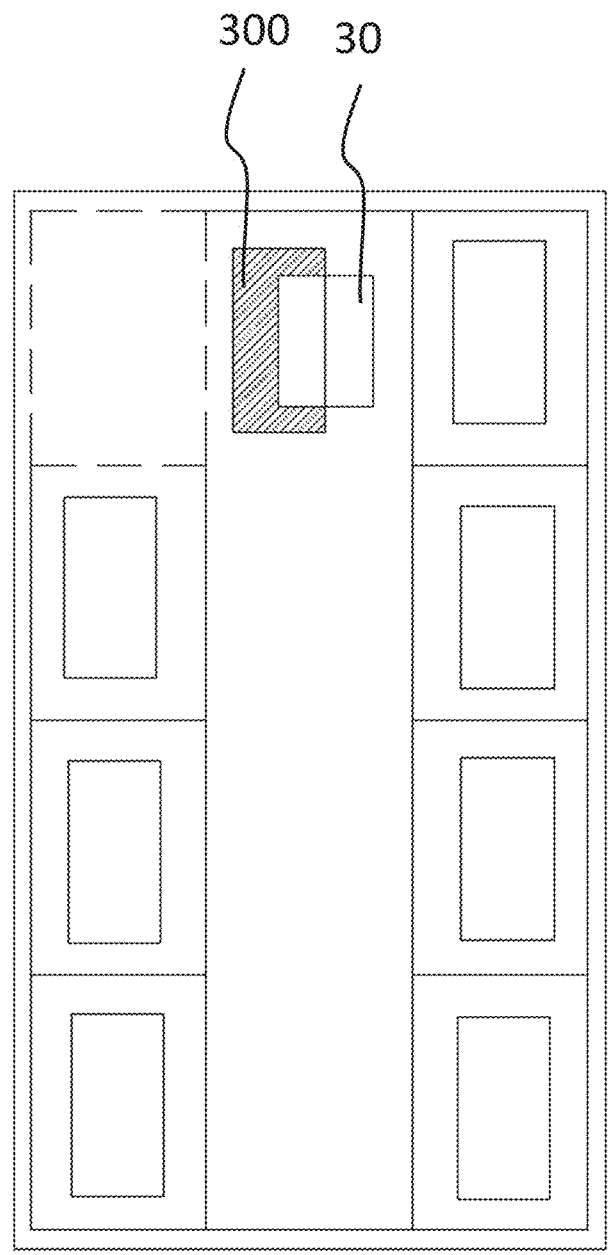
FIG. 5 is a schematic top view of a bus according to the first preferred embodiment of the present disclosure (illustrating how the unmanned handling unit transits the freight terminal).
Figure 6:
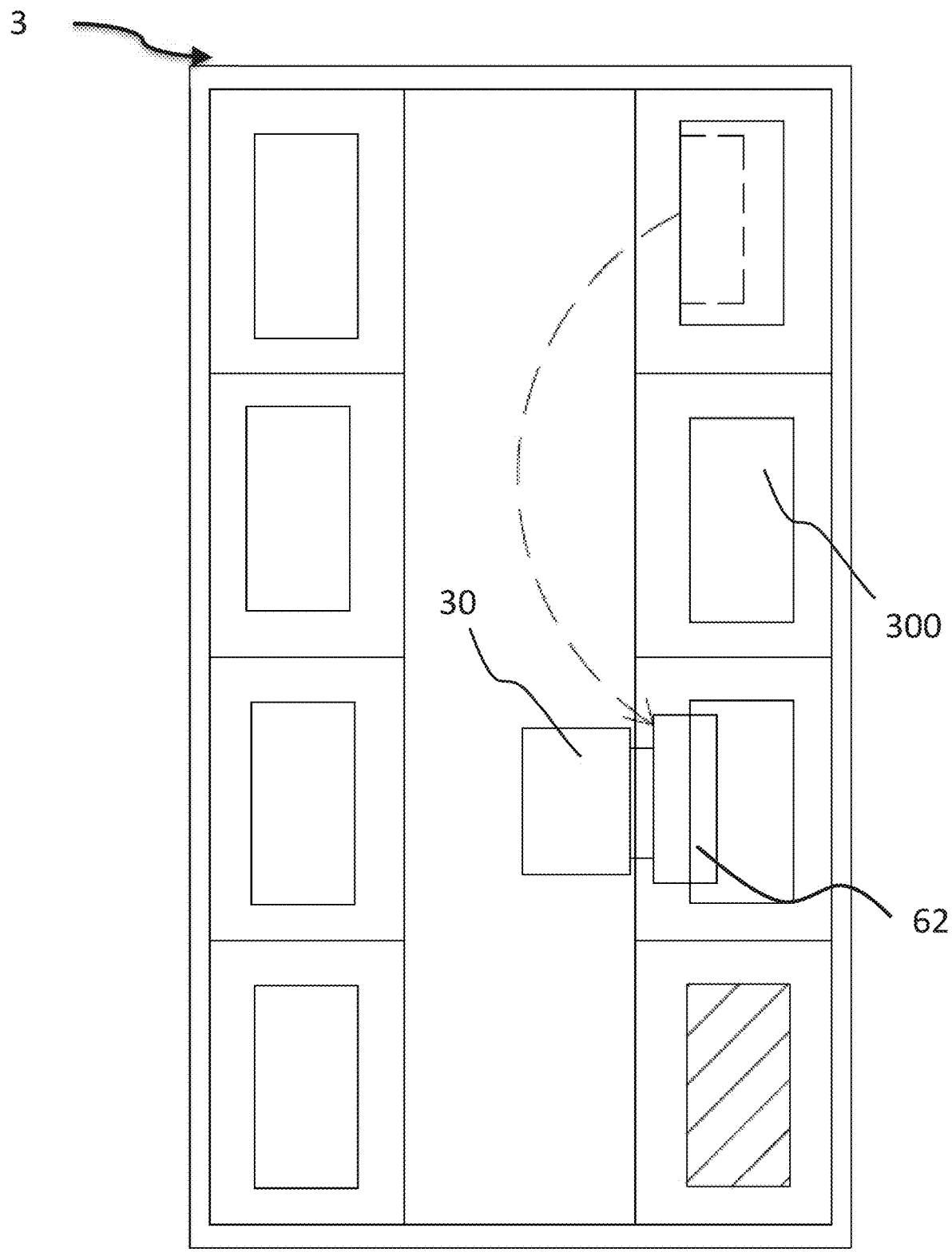
FIG. 6 is a schematic top view of the bus of FIG. 5 (illustrating how the unmanned handling unit takes out and exchanges loaded freight container modules).

The transport means 3 in this embodiment is illustrated exemplarily as a typical passenger bus shown in FIG. 5 and FIG. 6. At nights when the passenger services are off, the passenger bus is refitted to remove the seats, such that the passenger cabin is emptied to serve as a truck. The passenger cabin can accommodate for example eight freight terminals 300 and one unmanned handling unit 30. The unmanned handling unit 30 is exemplarily illustrated as a two-wheeled dynamic balancing cart. In this embodiment, the freight terminals 300 which can carry three-unit width and three-unit height of freight container modules are arranged along the walls of the passenger bus, like book shelves in a library; on the bus, the unmanned handling unit 30 shuttles between respective freight terminals to sort and transfer the freight container modules. Likewise, in step 81, each bus also transmits respective identifiers of the loaded freight container modules 62 carried thereon, and information regarding in which freight terminal 300 the loaded freight container module is stored, to the server 4 as payload information.

Figure 7:
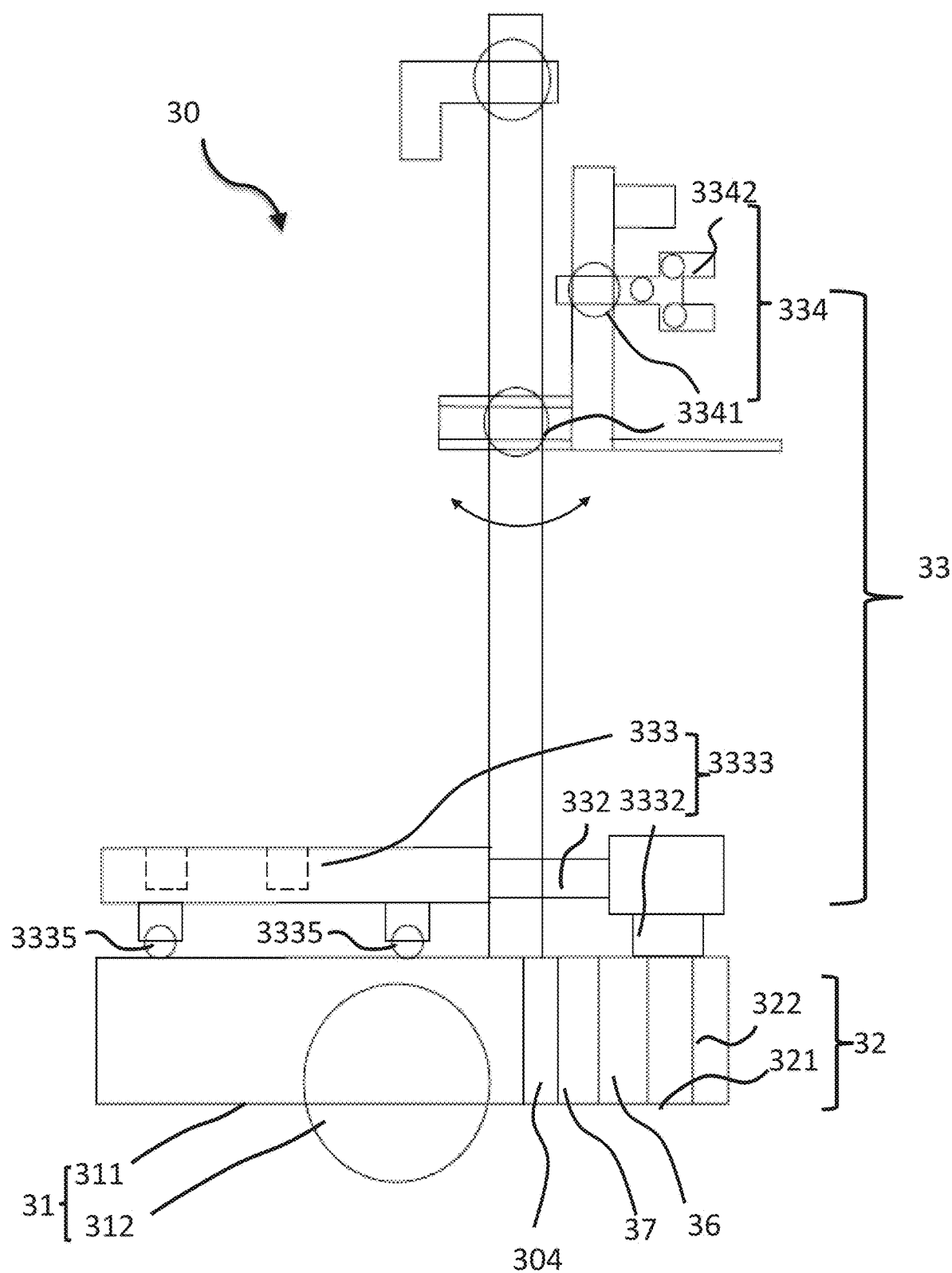
FIG. 7 is a schematic diagram of an unmanned handling unit according to the first preferred embodiment of the present disclosure.

As shown in FIG. 7, the unmanned handling unit 30 comprises: a chassis 31 including at least one load carrier 311 configured for securely bearing a freight terminal (not shown), two wheels that are rotatable relative to each other and arranged for the load carrier 311, two action actuation means 32 respectively configured for driving the wheels 312 and provided with energy storage means 321 and a charging port 322, and a retractable aided platform 33 that is retractable relative to the chassis 31.

The retractable aided platform 33 comprises a corpus 333 which is for example a servo oil pressure pump, and a group of movers 3335 which are disposed on the corpus 333 and configured for transferring the freight terminal. The corpus 333 has a lift unit 3332 which, for example, is exemplarily illustrated as a single-articulated oil pressure cylinder with wheels, wherein the lift unit 3332 and the group of movers 3335 jointly form a retractable lift table 3333, the lift table 3333 being configured for lifting the freight terminal, and a group of freight container module pickup and delivery means 334, which are disposed on an extended steel skeleton and/or corpus 333 of the chassis 31, and include at least two upright lift arms 3341 and a retractable pivotal arm 3342 cooperating with the lift arms respectively to actuate the pivotal lock bars.

The retractable aided platform 33 further comprises telescopic drive 332 that actuates the corpus 333 to move between a receiving position overlapping with the load carrier 311 in a height direction and an operating position mainly exposed outside the load carrier 311 in the height direction. The telescopic drive 332 is for example a multi-articulated oil pressure cylinder driven by the corpus 333.

Further provided on the chassis 31 are sensing means, for example, a gradienter, configured for sensing a balance status of the load carrier 311 and outputting a balance signal, and micro-processing means 37 configured for receiving the balance signal, computing, and respectively driving the action actuation means 32 to cause the load carrier 311 in balance with the at least two wheels.

The unmanned handling unit 30 may charge an energy storage unit 321 (e.g., a LiFePO4 battery) on the transport means or the freight terminal staging point via a charging port 322 such that the unmanned handling unit constantly maintains enough power; the unmanned handling vehicle 30 further has automatic guided means 304 which may guide the freight terminal (not shown) out of the freight terminal staging point (not shown) to the door of a vehicle.

Figure 8:
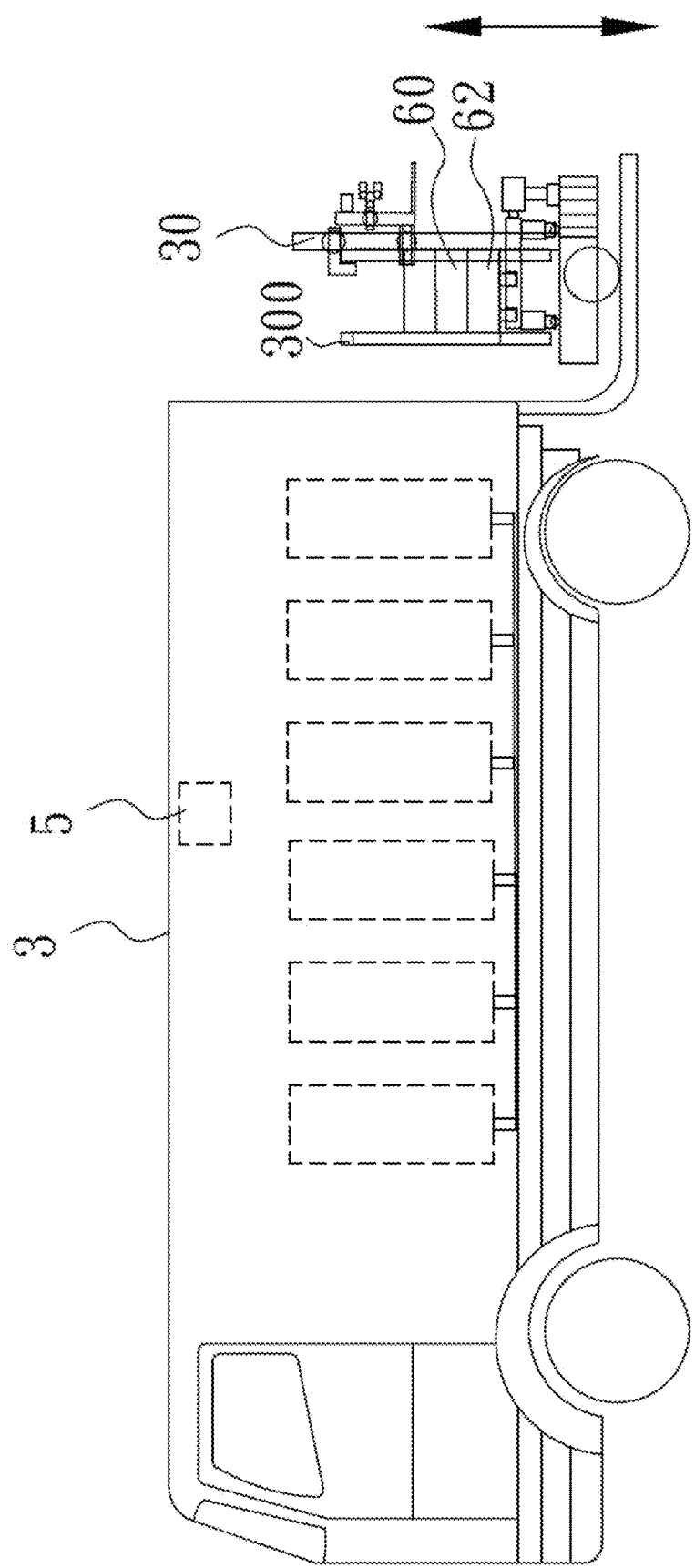
FIG. 8 is a schematic diagram of the unmanned handling unit moving out from a bus according to the first preferred embodiment.

Each bus is installed with a 5G wireless communication means 5; as such, when the server 4 computes an updated delivery solution based on the shipping information and the payload information in step 82, the shipment pickup and delivery data with respect to the bus are extracted out from the delivery solution as the delivery information for the bus and are then transmitted to the bus via the wireless communication means 5 in step 83; then, in step 84, the bus is instructed to travel to a parking lot near the freight terminal staging point. Referring to FIG. 8, in step 85, the unmanned handling unit 30 drops off from the lift table of the transport means 3 which is exemplarily illustrated as a bus, and autonomously travels to the freight terminal staging point to securely drop off, at the freight terminal staging point, the freight terminal 300 destined for the staging point, then picks up, from this staging point, the freight terminal 300 storing the loaded freight container module 62 and the empty freight container module 60, and then places them onto its own dynamic balancing cart, thereby completing a delivery-to-zone service featuring pickup and delivery of freight terminals in batches. Of course, as will be readily appreciated by those skilled in the art, the bus planned in this embodiment is an unmanned vehicle, which thus requires extensive information transmission; this is why a 5G network is exploited as the wireless communication means; if the bus is still manipulated by a driver, the wireless communication means may exploit a 4G or other similar means, which does not affect implementation of the present disclosure.

Figure 9:
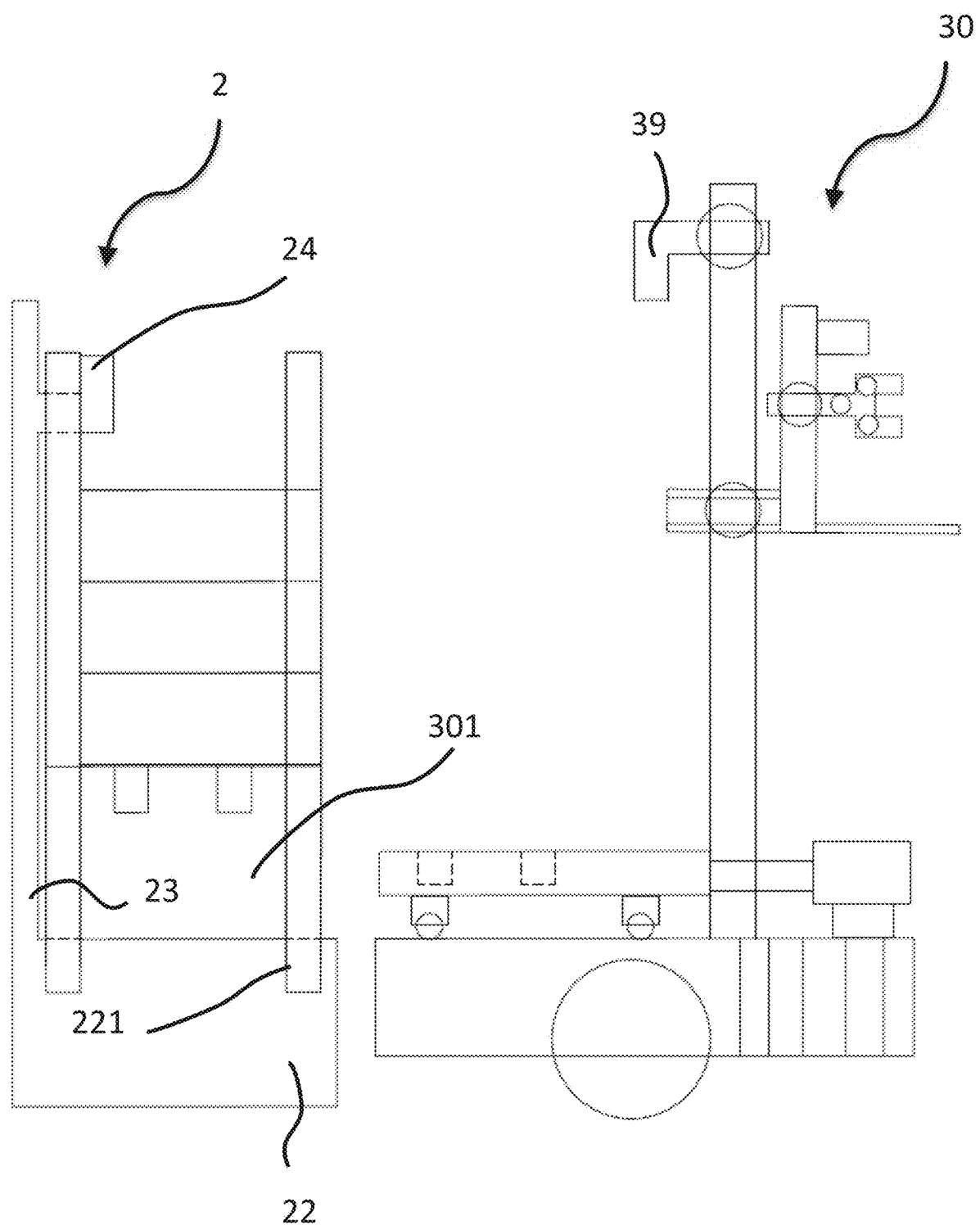
FIGS. 9-12 are schematic diagrams of the unmanned handling unit transferring a freight terminal according to the first preferred embodiment.
Figure 10:
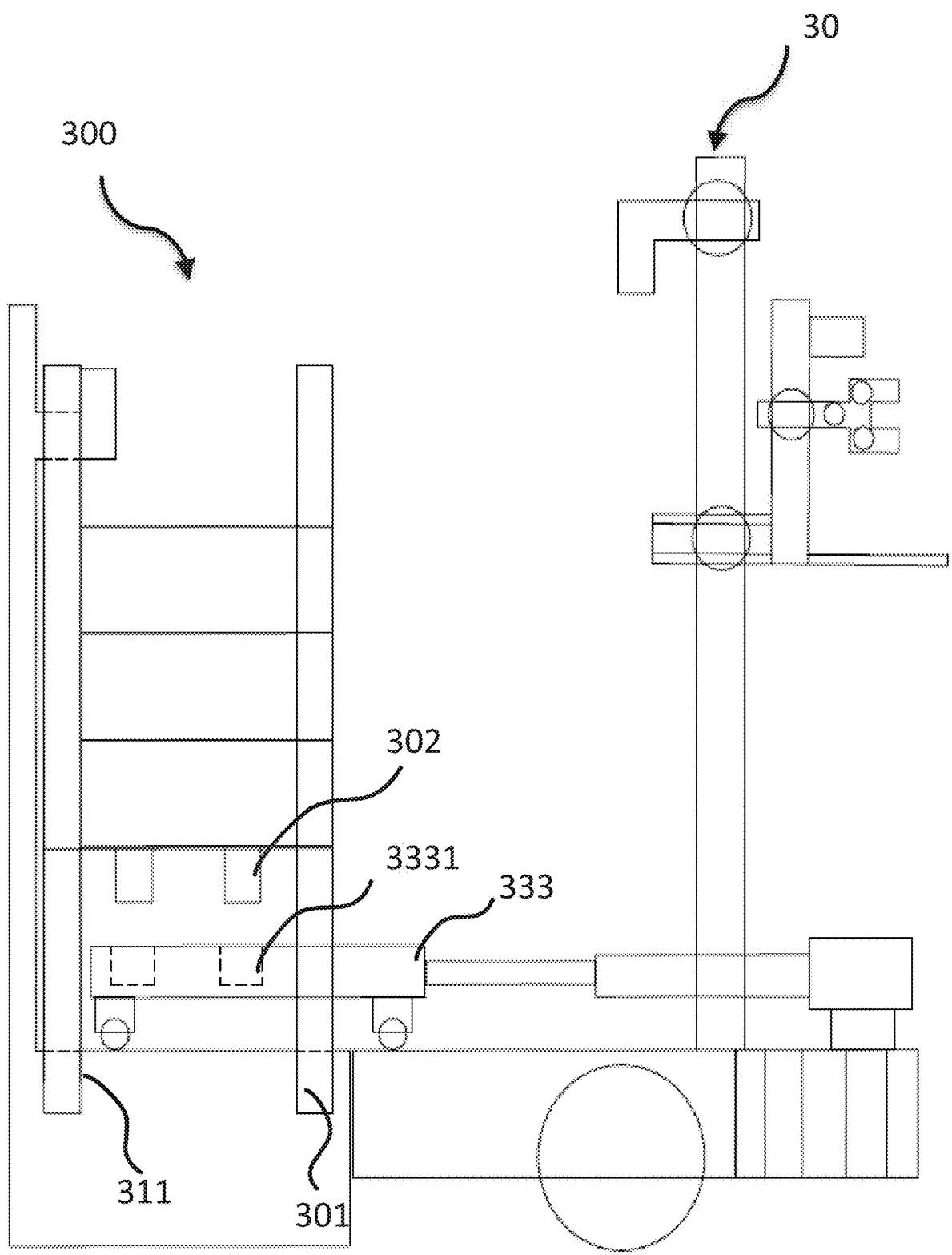

Please refer to FIG. 9 and FIG. 10. In this embodiment, the freight terminal staging point 2 has a base 22 with at least one of length and width sizes being greater than the freight terminal 300, wherein a staging point vertical mounting frame 23 is provided rear to the base 22, and a hanger 24 is provided above the base 22. When the freight terminal 300 is dropped off by the unmanned handling unit 30, a support in vertical surface is provided by the engagement between the hanger 24 and the staging point vertical mounting frame 23; and when the freight terminal 300 is lifted by the unmanned handling vehicle 30, it may shun away from the hanger 24 fixing the rear portion of the base, thereby facilitating moving the freight terminal 300 out. A snap-hook 39 is provided above the corpus 333 of the unmanned handling unit 30, wherein after the freight terminal 300 is transferred onto the unmanned handling unit 30, the snap-hook 39 engages the freight terminal 300 with the corpus 333 to provide a support in the vertical surface.

In this embodiment, a group of long feet 301 including three or above feet and a group of short feet 302 including three or above feet are provided at the bottom of freight terminal 300, while on the base 22, a long-foot slot 221 is respectively provided at a position corresponding to each long foot, for fitting with the long foot 301 to thereby insert the freight terminal 300 onto the base 22, and meanwhile a space is formed between the lower edge of the short foot 302 and the surface of the base 22, available for the group of movers 3335 of the unmanned handing unit 30 to access. A short-foot slot 3331 is respectively provided corresponding to each short foot 302 at a position on the group of movers 3335 of the unmanned handling unit 30, the short-foot slot 3331 fitting with the short foot 302 to securely support the freight terminal 300. As the width of the group of movers 3335 of the unmanned handling unit 30 is smaller than the width of the freight terminal 300, the group of movers 3335 of the unmanned handling unit 30 is extendable below the freight terminal 300 when the freight terminal 300 is inserted onto the base 22, causing each short-foot slot 3331 to be aligned with the corresponding short foot 302.

Figure 11:
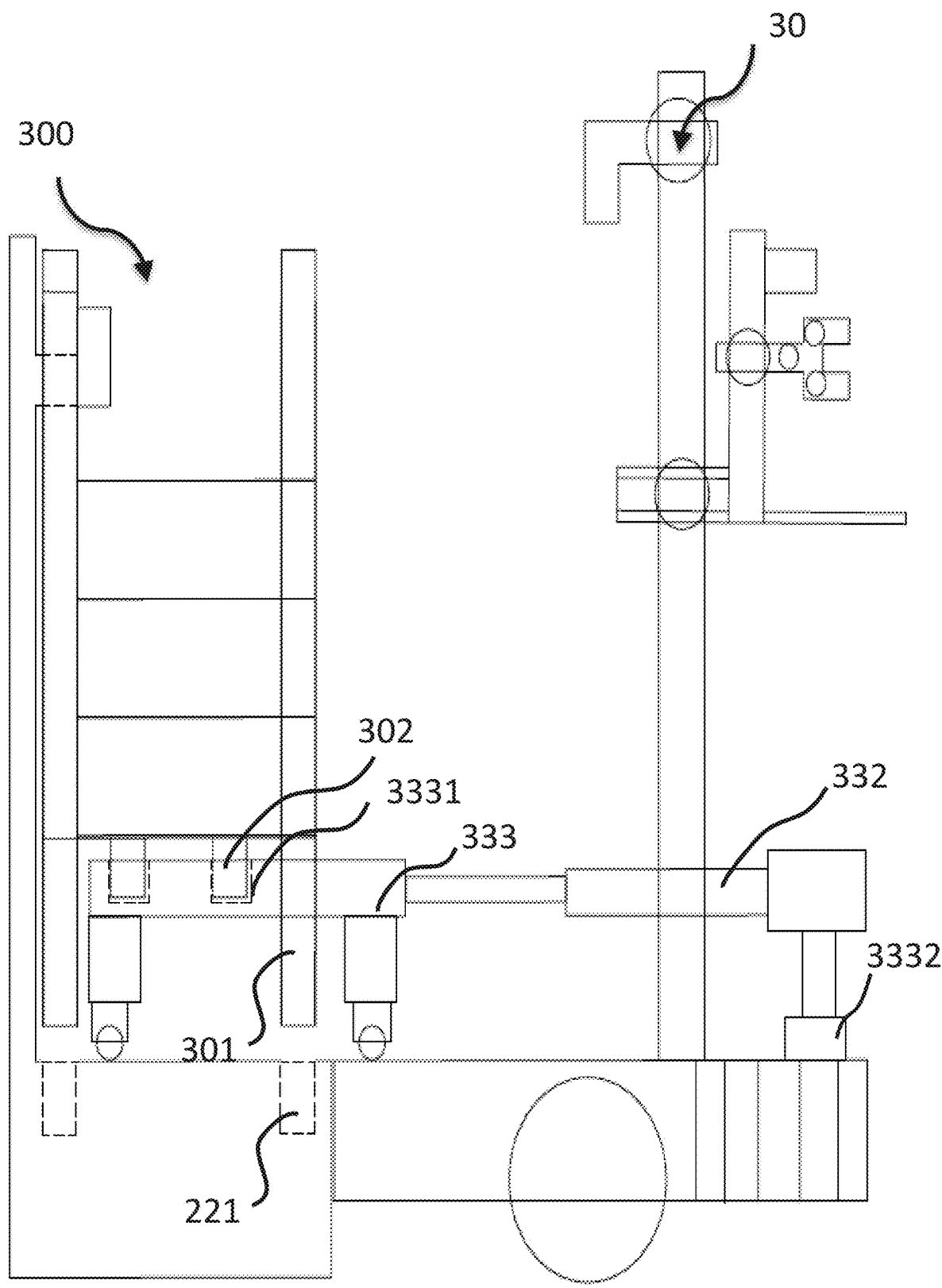
Figure 12:
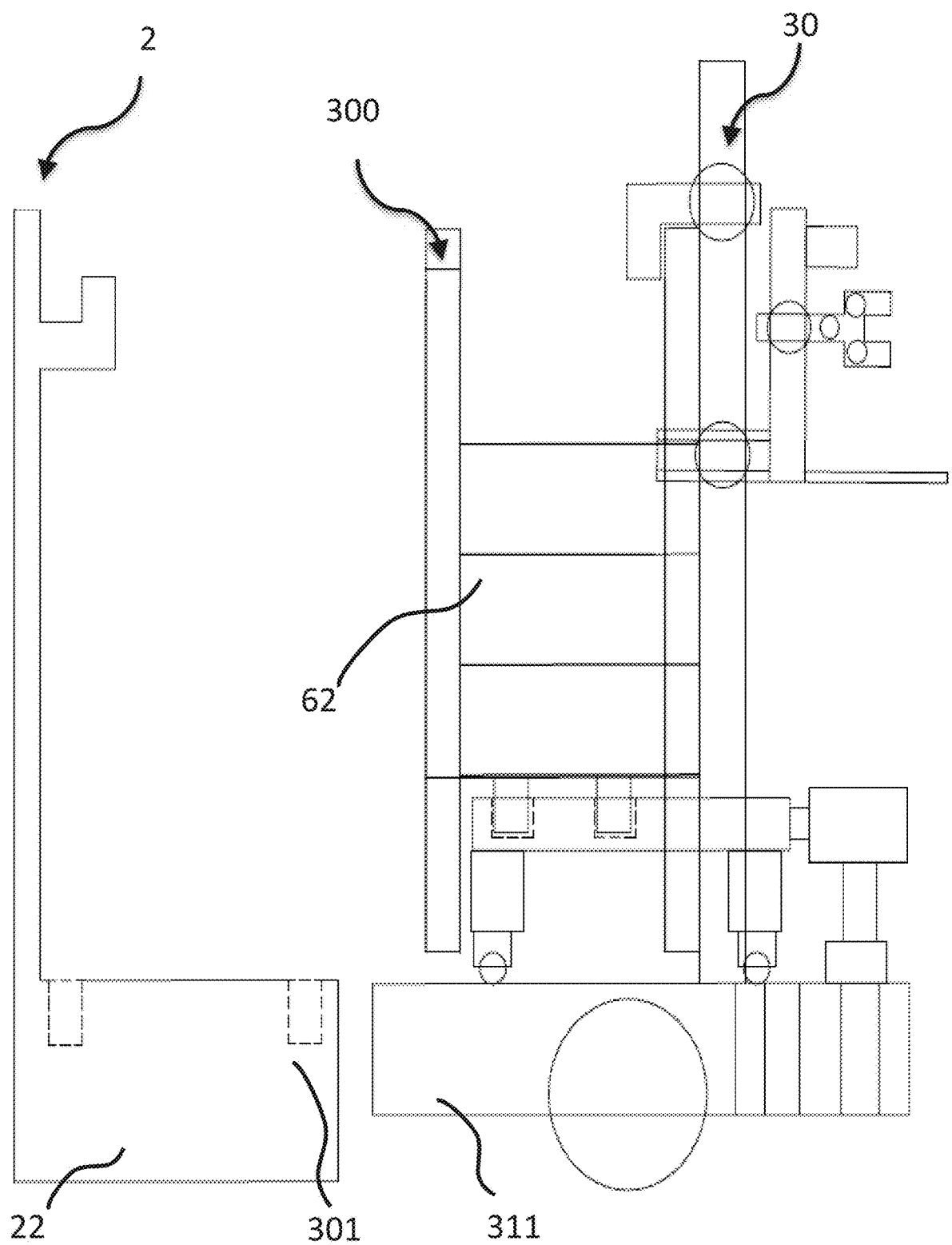

Please refer to FIG. 11 and FIG. 12. The lift unit 3332, which is exemplarily illustrated as a single-articulated oil pressure cylinder, lifts the group of movers 3335 to cause the short-foot slot 3331 to be engaged with the short foot 302, and further lifts the group of movers 3335 together with the freight terminal 300 to cause the long foot 301 to be detached from the long-foot slot 221; and then, the telescopic drive 332 moves the group of movers 3335 together with the freight terminal 300 to the receiving position overlapping with the load carrier 311; in this way, the freight terminal 300 is transferred from the base 22 of the freight terminal staging point 2 onto the unmanned handling unit 30 so as to continue transiting the freight terminal 300 storing the loaded freight container module 62 towards the predetermined target. In an alternative embodiment, following a reverse execution sequence, the unmanned handling unit 30 bearing the freight terminal 300 storing the freight container module 62 with the current freight terminal staging point 2 as the predetermined target may also insert the freight terminal 300 onto the base 22 of the current freight terminal staging point 2.

Figure 13:
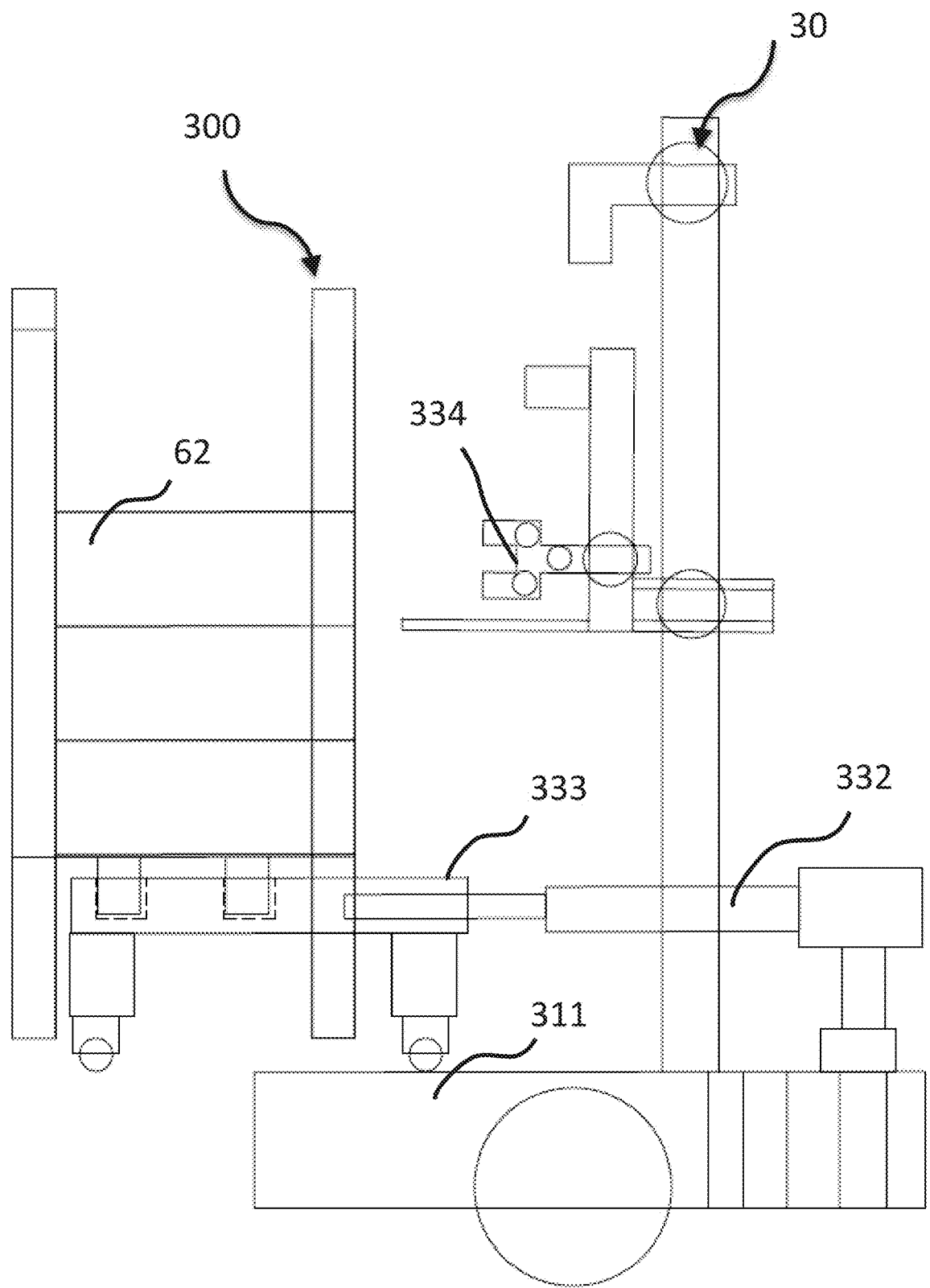
FIGS. 13-15 are schematic diagrams of the unmanned handling unit transferring a loaded freight container module from the freight terminal according to the first preferred embodiments of the present disclosure.
Figure 14:
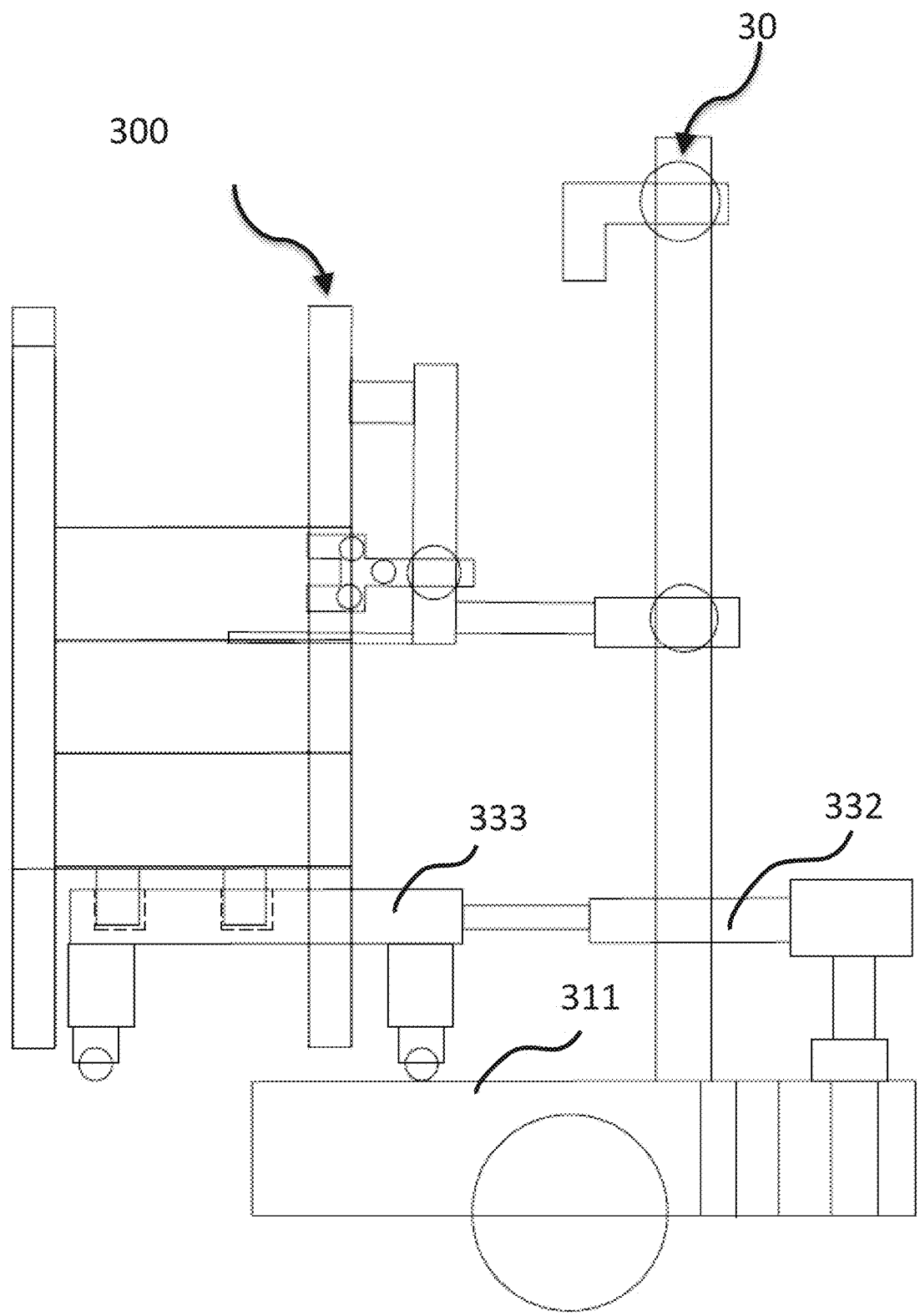
Figure 15:
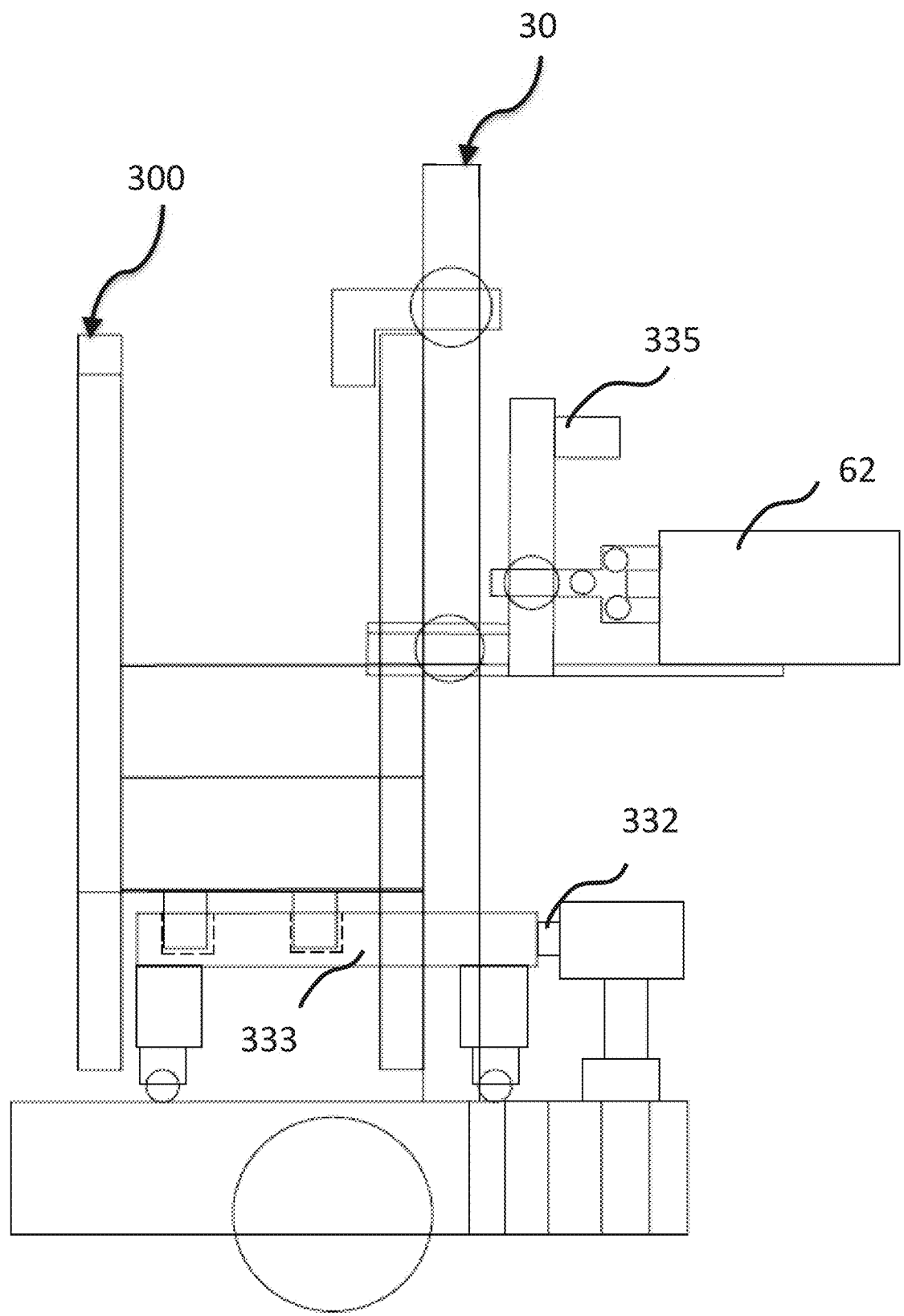

In this embodiment, when the predetermined target is a street vendor who urgently needs to replenish a batch of goods and whose distance from the freight terminal staging point is within the round-trip millage range of the unmanned handling unit 30, the server contacts and confirms with the vendor as the predetermined target and then notify the unmanned handling unit 30 to deliver. Please refer to FIGS. 13-15, after the unmanned handling unit 30 arrives at the the predetermined target and confirms the latter's identity, the telescopic drive 332 moves the group of movers 3335 along with the freight terminal 300 to an operating position exposed outside the load carrier 311; the pickup and delivery means 334 takes out the loaded freight container module 62 from the freight terminal 300; then, payload confirmation means 335, which is provided on the unmanned handling unit 30 and exemplarily illustrated as an image bar code scanner, confirms consistency with the content data of the loaded freight container module 62; and then the freight container module 62 is passed to the vendor as the predetermined target, thereby completing the delivery-to-hand service. With this smart unmanned handling unit, the reconfigurable decentralized shipping system can efficiently and flexibly provide services based on the delivery and reception demands, and may further avoid repeated delivery due to unavailability of the recipient.

In step 86, when the unmanned handling unit 30 returns to board on the transport means 3, as the freight terminal staging point 2 in this embodiment is not equipped with communication and processing means, the unmanned handling unit 30 in this embodiment, which is exemplarily illustrated to have a processor and a communicator, transmits the identity two-dimensional bar code of the newly picked-up loaded freight container module 62 and the locker number for the newly picked-up loaded freight container module 62 on itself to the bus. The microcomputer on the bus saves the loaded conditions of respective freight terminals 300 on the respective unmanned handling units 30 on the bus and the data of all carried freight container modules into a memory unit on the bus, for example, a solid-state disk. Afterwards, the microcomputer uploads, at regular intervals, the bus payload information to the server 4 via the wireless communication means 5. In this way, the server 4 and the respective transport means 3 exchange and update all payload information and delivery information at regular intervals.

Figure 16:
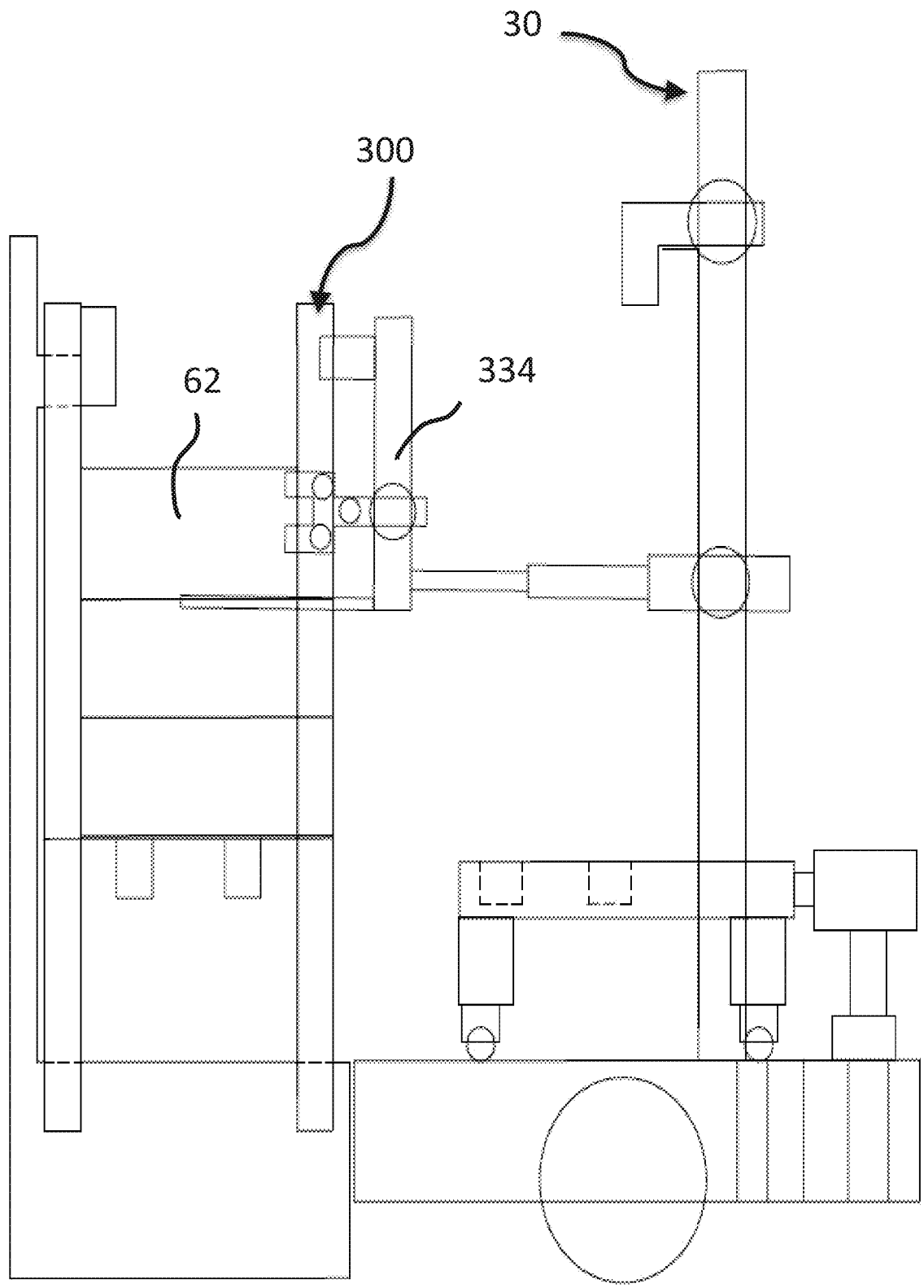
FIG. 16-17 are schematic diagrams of the unmanned handling unit transferring a loaded freight container module from the freight terminal in a transport means according to the first preferred embodiment of the present disclosure.
Figure 17:
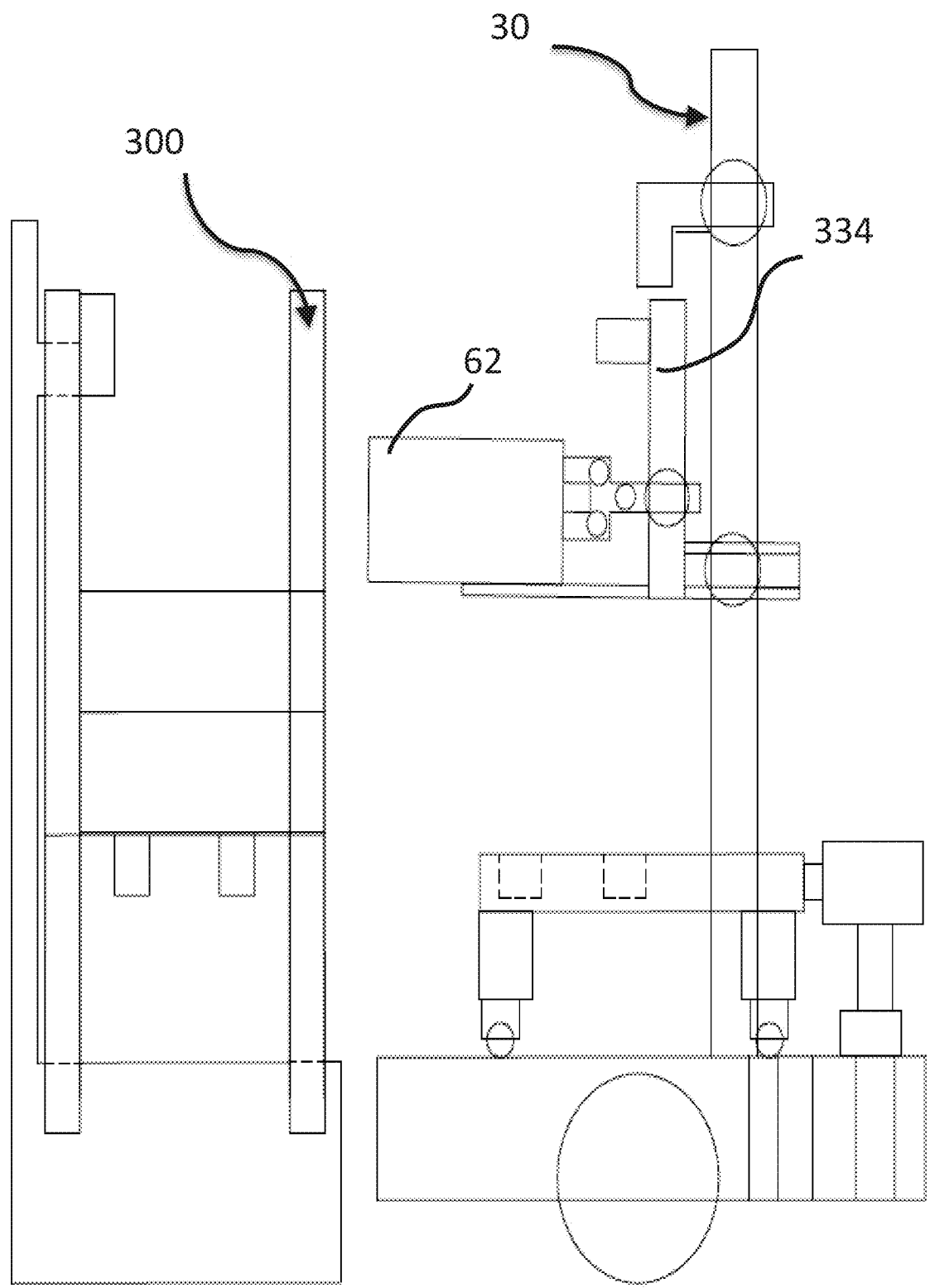

Please refer to FIG. 6, FIG. 16, and FIG. 17, because like on the freight terminal staging point, a base, a staging point vertical mounting frame, and a hanger are also provided on the transport means 3 to securely fix the freight terminals 300 which are arranged in a straight row, the unmanned handling unit 30 further sorts the loaded freight container modules 62 on the transport means 3 to assemble, into a particular freight terminal 300, the loaded freight container modules 62 to be sent out by the next predetermined target or from the predetermined staging point. For example, pickup and delivery means 334 is leveraged to take out the loaded freight container modules 62 from the freight terminal 300 onto the transport means 3 and then transfer them to the next freight terminal 300.

If the delivery information in step 84 instructs a bus to travel to a location intersected with a neighboring operating area to exchange shipments with a counterpart bus from the neighboring operating area, then in this embodiment, one or more dynamic balancing carts in the bus are be assigned to assemble, on the bus, all freight container modules 62 to be transferred to the neighboring operating area into one or more freight terminals. In step 87, the buses from the two neighboring operating areas meet at the intersected location, and the one or more dynamic balancing carts on the current bus, along with the freight container modules loaded in their freight terminals, are transshipped together to the counterpart bus, while a corresponding number of dynamic balancing carts from the counterpart bus also travel into the current bus, thereby completing exchanging of payloads, which also allows for efficient exchange of shipments in batches between operating regions. Likewise, in step 87, when the exchanged dynamic balancing carts travel into the range of the current bus, the identifiers of the dynamic balancing carts and the payload information of their freight terminals are transmitted back to the server 4 following step 86.

Therefore, each time after a loaded freight container module or a freight terminal is delivered to the predetermined target or the predetermined staging point, the server 4 receives a corresponding payload information update, and then information regarding arrival of the loaded freight container module 62 is transmitted to the predetermined target for collecting the shipment. Particularly, if the predetermined target changes his/her schedule provisionally, e.g., going to another place for a conference, and urgently needs for example the sample in the loaded freight container module 62 for presentation, he or she may notify the server 4 of the updated shipping information before the shipment arrives, and the server 4 executes step 88 to real-time confirm whether the updated shipping information is received; after the server 4 receives the updated shipping information, step 89 is executed to update the initial delivery information based on the updated shipping information; while during operating of the bus, the server 4 re-executes step 83 to real-time transmit the updated delivery solution; after the bus receives the updated shipping information, the bus assigns a dynamic balancing cart on the bus based on the updated shipping information to thereby exchange the position of the freight terminal storing the loaded freight container module, and the unmanned handling unit delivers the container module to the freight terminal staging point near the place of conference according to the updated delivery solution, or even directly hand the container module to the recipient, thereby significantly reducing repeated delivery due to delivery failure. However, if the server 4 does not receive any updated shipping information, the bus starts re-executing step 84 to confirm the next stop.

As the server 4 constantly receives all shipping information, the real-time locations of all transport means 3 in their respective operating areas, transit information such as the ongoing traveling routes, and payload information of each transport means 3, and constantly iteratively updates the latest delivery solutions, it can respond in real time to provisional shipping data change of the shipper or the recipient, such that the unmanned handling unit disclosed by the present disclosure completes the last-mile pickup and delivery, totally satisfying fast and flexible demands of the modern society. On the other hand, as the shipping and transshipment are done by various transport means and unmanned handling units in a decentralized manner, a dedicated cargo hub is eliminated, which not only saves investments on the hub, but also avoids waste of time in repeated assembling and dispatching of shipments; particularly, during the shipping process, there is no urgent time pressure involved with a hub and all freight container modules can be simultaneously sorted and exchanged while the buses are operating, which reduces errors in the distribution process and lowers the risks of damaging the freight container modules incurred by urgent delivery time.

Second Preferred Embodiment

Figure 18:
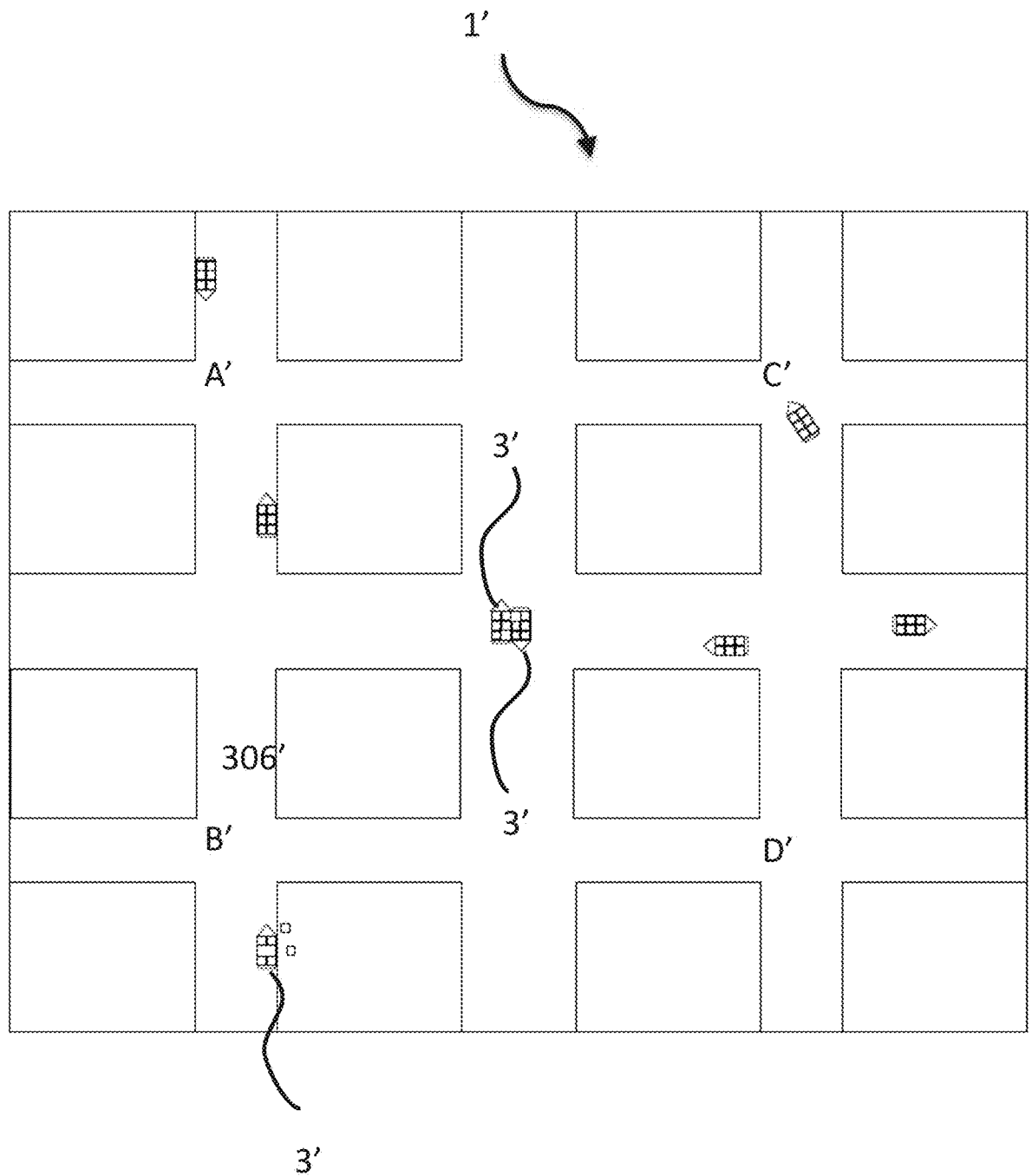
FIG. 18 is a schematic diagram of operating regions of a reconfigurable decentralized shipping system according to the second preferred embodiment of the present disclosure.

FIG. 18 shows a reconfigurable decentralized shipping system according to the second preferred embodiment of the present disclosure, where those parts identical to the first preferred embodiment will not be elaborated, and only those different parts are illustrated. In this embodiment, the reconfigurable decentralized shipping system 1' refers to an industrial port including 4 neighboring coastal industrial zones A', B', C', and D' which are of a specific industrial chain, while the transport means 3' in each industrial zone is for example a cargo boat; each industrial zone includes a plurality of midstream and downstream plants of the same industry, supplying semi-finished products or parts to each other. Inside the industrial zones, watercourses are crisscrossed, such that a private dock is set up near the warehouse of each plant. In this case, water transportation is exploited instead of land transportation. In this embodiment, the cargo boats from neighboring industrial zones receive or exchange goods on the water side by side at intersections of watercourses, or directly shuttle on the water to deliver goods, or directly transport goods between the docks of respective plants of respective industrial zones and the docks where the predetermined targets are located.

In this embodiment, the shipper is for example an unmanned plant with a production mode of small batch and multi-variety. Each shipment of the shipper includes a plurality of goods of different sizes delivered to downstream plants at different locations. In the shipper end, the goods are directly packed into loaded freight container modules using various sizes of freight containers at the production line terminal and securely stored in a freight terminal. A plurality of freight terminal staging points are set up inside the plant as unmanned warehouse systems. As such, it is not the case that the goods are moved out from the warehouses before the shipment and then packed with empty freight container modules. Upon shipping, the shipper notifies delivery information including quantities of various sizes of loaded freight container modules, delivery time, content item information, location information of freight terminals, and predetermined destination address, etc., to the server over the network, thereby completing shipment sending. Those downstream plants also directly set up a plurality of freight terminal staging points in the raw material warehouses as unmanned storage systems, where goods are packed with various sizes of freight container modules and securely stored in the freight terminals, thereby facilitating material management and access.

Figure 19:
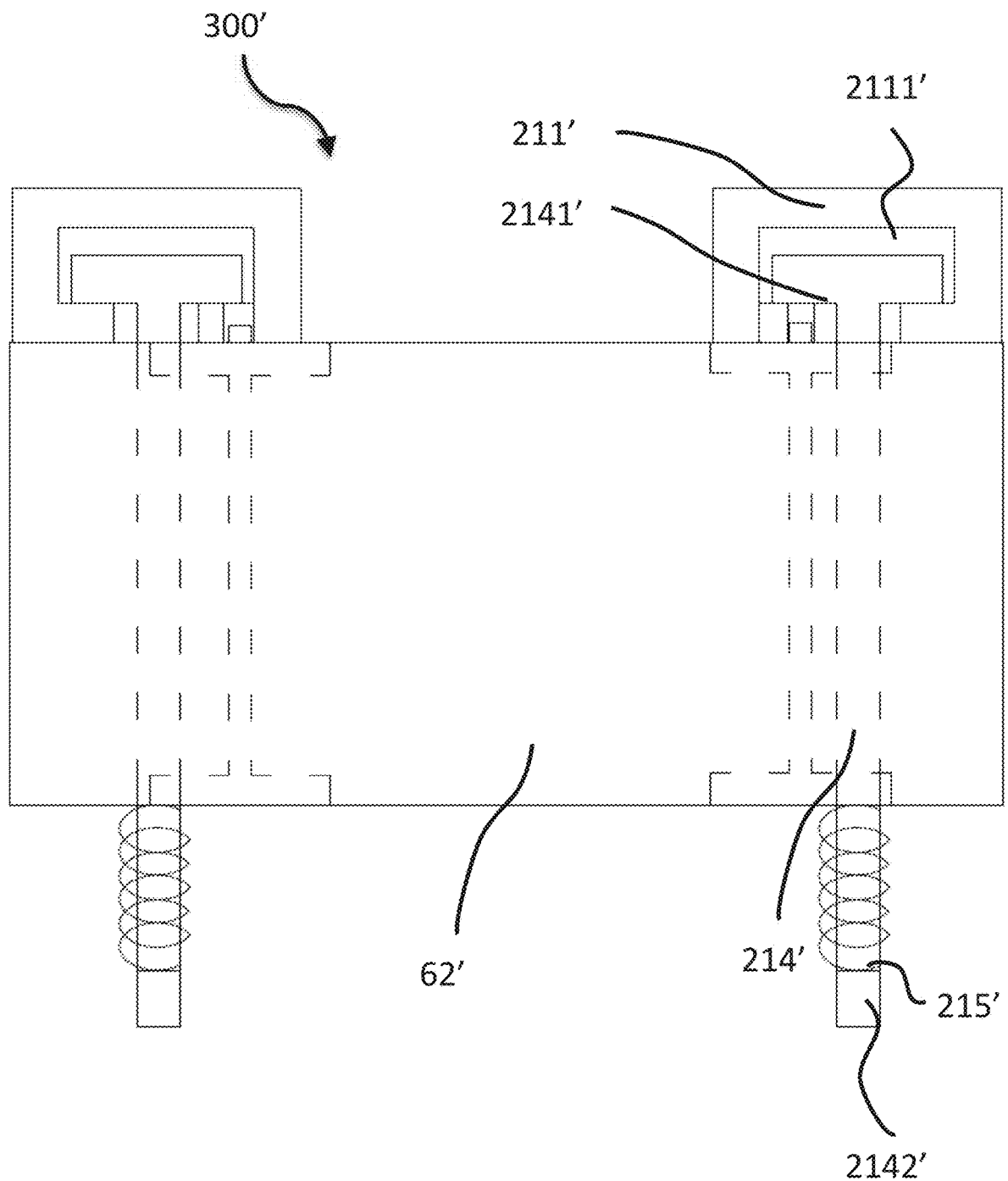
FIG. 19 is a schematic perspective top view of a freight terminal (illustrating the size and fixation manner of a freight container module) according to the second preferred embodiment.

Please refer to FIG. 19. In this embodiment, the immobilized column 211' in the freight terminal 300 adopts a C-profile steel column, while a pivotal lock bar 214', for example a T-shaped long bar inherent with a spring 215', is respectively provided at two ends of each freight container in the width direction; one end of the pivotal lock bar 214' is a hooking member 2141' exemplarily illustrated as a T-shape buckle, while the other end is a grip 2142' exemplarily illustrated as a T-shaped grab handle; furthermore, the long-axis direction of the grip 2142' is mutually perpendicular to the long-axis direction of the hooking member 2141'. To engage the immobilized column 211' with the pivotal lock bar 214', after the hooking member 2141' of the pivotal lock bar 214' is pushed into the hollow portion opening 2111' of the immobilized column 211', the grip 2142' is manipulated to rotate 90° clockwise or counter-clockwise to cause the long-axis direction of the hooking member 2141' to be orthogonal to the long-axis direction of the hollow portion opening 2111' of the pivotal lock bar 214', and then the pivotal lock bar 214' is released to cause the hooking member 2141' to catch the immobilized column 211' under the relaxed elasticity of the spring 215', thereby completing the action of placing the loaded freight container module 62' into the freight terminal 300'.

As each freight container module has a unique identifier such as a standard code, the loaded freight container module 62' can be clearly identified. The freight terminal staging point utilizes the wired network provided by the plant as a communication unit to transmit the shipping information to the server for computing out a delivery solution, instructing the transport means and the unmanned handling unit corresponding to its operating area to come to pick up the shipment, meanwhile carrying an empty freight container module of the same size to the same location of the freight terminal.

After receiving and computing the delivery information over the network, the server assigns a transport means, which, for example, is a cargo boat carrying 8 freight terminals and 2 unmanned handling units that are adaptable to cross height differences when the cargo boat come ashore or when two cargo boats meet side by side on water, to approach to the shipper's private dock and enter the freight terminal staging point of the plant warehouse system to pick up and deliver goods. The server also arranges the transport means to exchange goods with the unmanned handling unit in another transport means coming from a neighboring industrial zone at an intersection between operating areas.

Figure 20:
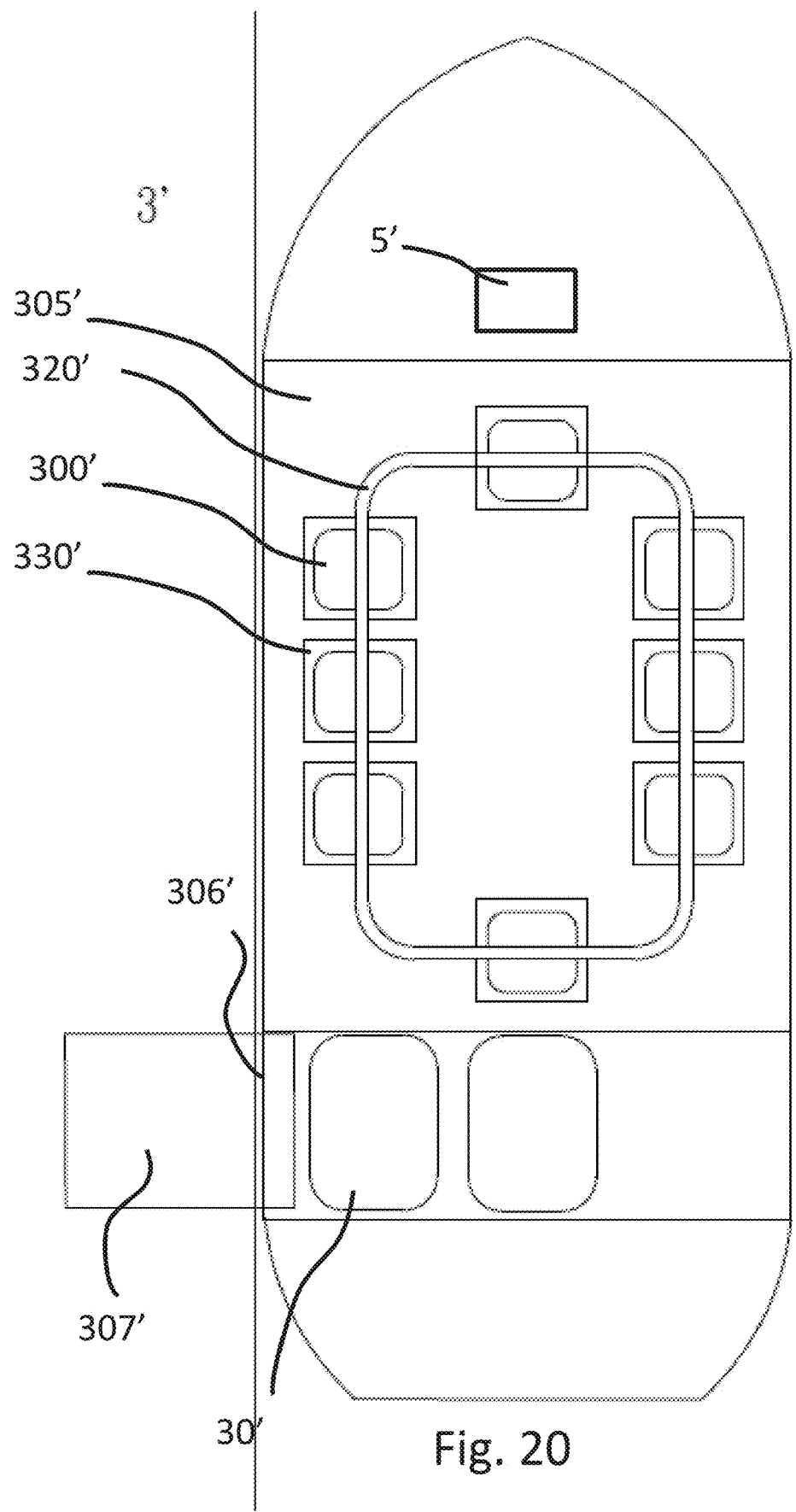
FIG. 20 is a schematic diagram illustrating docking of the transport means and configurations of the freight terminal thereon according to the second preferred embodiment of the present disclosure.
Figure 21:
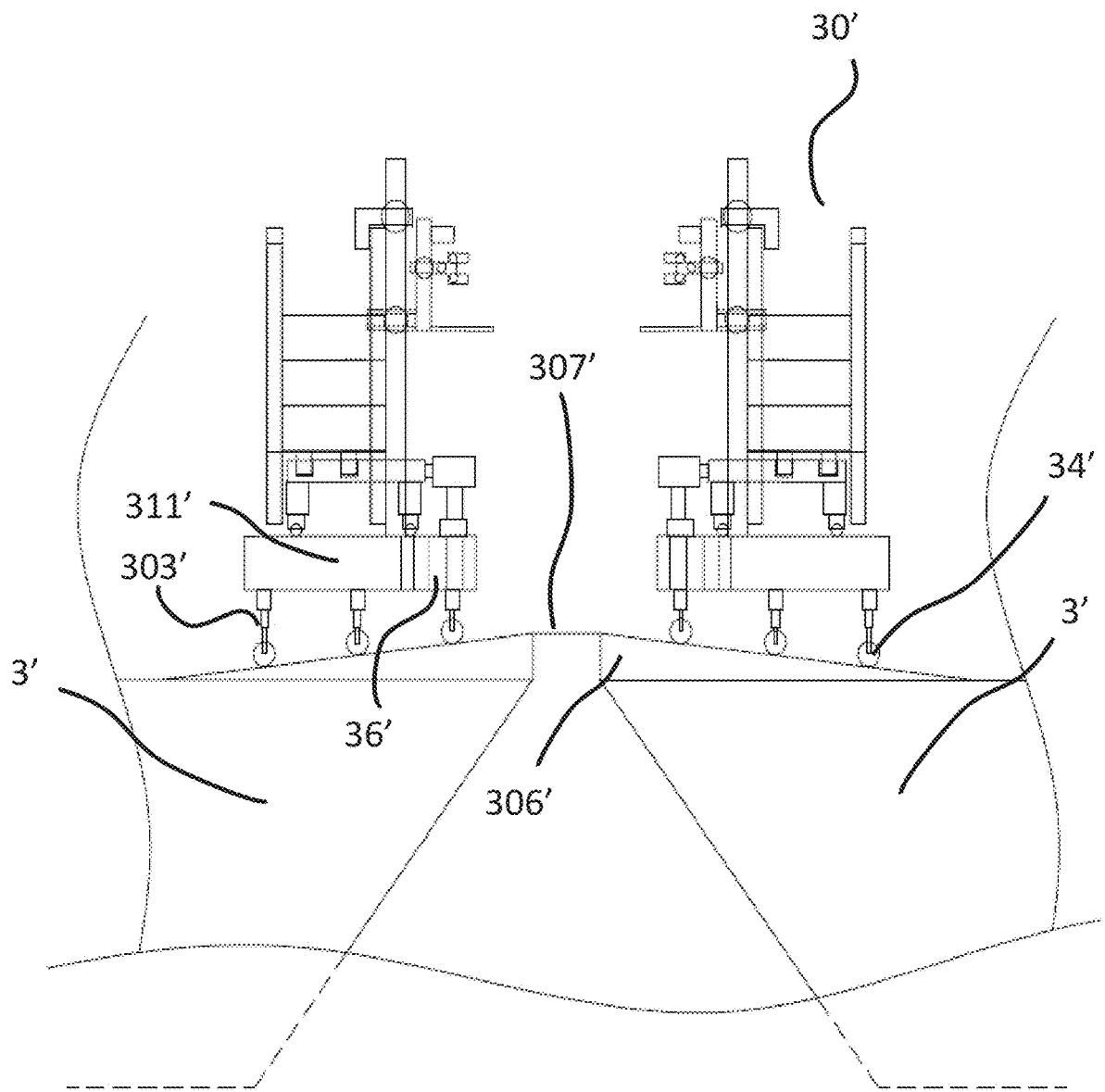
FIG. 21 is a schematic diagram of two transport means meeting at a watercourse intersection and exchanging unmanned handling units thereon according to the second preferred embodiment of the present disclosure.

As shown in FIG. 20 and FIG. 21, a freight terminal receiving unit 305' is provided on the transport means 3'; the freight terminal receiving unit 305' includes a closed railway 320' and a plurality of pallets 330' for bearing the freight terminals 300' to revolve on the railway 320'; as to the engaging and detaching manner with the freight terminal 300' on each pallet 330', the features identical to the freight terminal staging point in the preceding embodiment will not be detailed. In this embodiment, the closed railway 320' revolves to convey the freight terminal 330' above. A plurality of freight terminals 300' are provided on the closed rail 320'; when the unmanned handling unit 30' picks up the loaded freight container module from the freight terminal staging point and enters the transport means, the railway 320' drives the freight terminal 300' corresponding to the loaded freight container module in the downstream plant, such that the freight terminal 300' revolves to the position corresponding to the unmanned handling unit 30' for securely placing the loaded freight container module.

The transport means 3' is likewise provided with wireless communication means 5', for, on one hand, reporting its own position as the transit information back to the server, and on the other hand, reporting the payload conditions of respective freight terminals 300' in the cargo boat as payload information. During traveling of the transport means 3', under assistance of the closed railway 320', the unmanned handling units 30' constantly re-sort the freight terminals 300' in respective freight terminal receiving units 305', such that those loaded freight container modules 62' to be shipped to the same or associated operating areas are sorted to the same or neighboring freight terminals 300'; meanwhile, based on the delivery solution provided by the server, the unmanned handling units prepare empty freight container modules needed at the next freight terminal staging point so as to exchange with the loaded freight container modules in the next freight terminal staging point, for subsequent shippers to use. Of course, as will be easily appreciated by those skilled in the art, in this embodiment, the freight terminal stating point is provided with a communication unit, such that besides being communicatively connected with the server, the freight terminal staging point can also select to communicate and exchange information with the transport means or the unmanned handing unit.

In this embodiment, a specific access port 306' and a bridging board 307' are provided at a side of the transport means 3' which is a cargo boat, the access port 306' and the bridging board 307' being available when the unmanned handling unit 30' embark or disembarks the cargo boat docking, being available for docking the shuttle boats from two neighboring industrial zones when meeting. The unmanned handling unit 30' includes 3 pairs of wheels 34' which are arranged for the load carrier 311' and capable of being independently lifted and rotated in pairs via the multi-articulated cylinder 303'. Irrespective of coming shore or meeting with a cargo boat from the neighboring industrial zone, height differences always occur between the cargo boat and the dock or between two side-by-side cargo boats due to wave fluctuations and the cargo boat itself also rocks with wave fluctuations. In this embodiment, the sensing means 36' refers to a gyroscope which is well known for its dynamic balance maintenance at high speed, configurable for dynamically regulating the stroke of the multi-articulated cylinder 303' to constantly maintain stability of the unmanned handling unit 30'.

When the transport means 3' arrives at the intersection between neighboring operating areas, the unmanned handling unit 30' places the to-be-exchanged empty freight container modules and loaded freight container modules into its own freight terminal 300' and then travels, through the bridging board 307' erected between sides of two side-by-side transport means 3', to another transport means 3' from the neighboring industrial zone. In this embodiment, exchange of the unmanned handling unit 30' does not occur; instead, the unmanned handling unit 30' from the counterpart transport means 3' enters the current cargo boat to offload the freight terminal 300', then loads the freight terminal 300' to be carried back to the counterpart transport means 3', and then returns to its own transport means 3'. As the whole shipping process is performed in respective intersected watercourses in a decentralized manner, a dedicated hub is unnecessary for the shipping system according to the present disclosure; instead, during traveling, all the loaded freight container modules on the transport means 3' are first sorted and relevant information regarding the loaded freight container modules is reported back to the server. In this way, even the receiving plant notifies the server that its material reception address changes to a freight terminal staging point at another warehouse, the server still can meet the recipient plant's demand to change the delivery solution. In this way, the circumstance of delivery failure can be almost eliminated, thereby enhancing delivery success rate and lowers costs.

Of course, as will be easily appreciated by those skilled in the art, in other embodiments, the pivotal lock bars and the immobilized columns may be combined in other manners, e.g., a pair of strong magnets which may be attracted and rejected with respect to each other by reversing directions, or a power chuck and a to-be-attached planar component. The present disclosure does not limit the mutual locking or detaching manner between the freight container module and the freight terminal or limit the mechanism of mutually locking means.

In view of the above, by providing a short-foot slot at the position corresponding to each short foot on the load carrier to engage the short-foot slot with the short foot and providing a hanger above the vertical mounting frame of the unmanned handling unit to engage the unmanned handling unit with the freight terminal, the unmanned handling unit for a reconfigurable decentralized shipping system as disclosed according to the present disclosure provides a support in vertical surface; in this way, the freight terminal is securely stored on the unmanned handling unit. Besides, the freight container modules may be transported in batches by the freight terminals, which solves the identification and shipment safety issues in positioning the freight container modules and preventing displacement and falloff. Furthermore, with a plurality of standard sizes, the freight container modules can be tidily and compactly stacked, which reduces waste of truck body space and reduces truck attendance times. Moreover, by updating the delivery solution in real-time via the wireless network and the computing unit, the shipped items are well preserved in the freight container modules and securely handled by the unmanned handling units, which guarantees safety and security of the items and prevents mistaken delivery. With the real-time shipping system provided by the present disclosure, the logistics service provider may deposit, pick up, and transit the items quickly and accurately or may change the shipment destination address and delivery time in real time, such that the recipient and the shipper can both receive or send at any convenient time and effectively; and the shipment can be effectively picked up, delivered, and collected, which significantly improves the efficiency of conventional shipping systems and achieves a revolutionary improvement.

What is claimed is:

1. An unmanned handling unit for a reconfigurable decentralized shipping system, comprising:

a chassis including at least one load carrier for securely bearing a freight terminal, at least two wheels that are rotatable relative to each other and provided at the load carrier, and a plurality of motor assemblies respectively for driving the wheels;

a retractable assisted platform that is retractable relative to the chassis, the retractable assisted platform including a corpus, a telescopic drive configured to drive the corpus to move between a receiving position that overlaps with the load carrier in a height direction and an operating position exposed outside the load carrier in the height direction, and a group of movers disposed on the corpus for transferring the freight terminal; and one or more freight container modules disposed on the freight terminal, wherein the chassis further includes a sensor configured to sense a balance status of the load carrier and outputting a balance signal, and a microprocessor configured to receive the balance signal, computing, and respectively driving the motor assemblies to cause the load carrier in balance with the at least two wheels.

2. The unmanned handling unit for a reconfigurable decentralized shipping system according to claim 1, wherein a vehicle includes at least on set of wireless communication devices, and the chassis further includes one wireless communication device communicatively connected to the set of wireless communication devices.

3. The unmanned handling unit for a reconfigurable decentralized shipping system according to claim 1, further comprising a payload checker configured to confirm data of respective freight container modules in the freight terminal.

4. The unmanned handling unit for a reconfigurable decentralized shipping system according to claim 1, wherein the chassis and/or the retractable assisted platform includes a retractable lift table configured to lift the freight terminal.

5. The unmanned handling unit for a reconfigurable decentralized shipping system according to claim 1, wherein the freight terminal is provided with a plurality of pairs of immobilized columns, the spacing between the plurality of pairs of immobilized columns corresponding to one of the plurality of predetermined sizes, each freight container module including a body, an identification mark disposed on the body, and a pair of pivotal lock bars that are actuatable to partially protrude from the body; and the freight container module includes at least two upright lift arms, and retractable pivotal arms cooperating with the lift arms to actuate the pivotal lock bars.

\* \* \* \* \*